(12) United States Patent
Vasylyev

(10) Patent No.: US 9,772,080 B2
(45) Date of Patent: *Sep. 26, 2017

(54) OPTICAL ARTICLE FOR DIRECTING AND DISTRIBUTING LIGHT

(71) Applicant: Sergiy Vasylyev, Elk Grove, CA (US)

(72) Inventor: Sergiy Vasylyev, Elk Grove, CA (US)

(73) Assignee: SVV TECHNOLOGY INNOVATIONS, INC., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,850

(22) Filed: Sep. 18, 2015

(65) Prior Publication Data

US 2016/0010820 A1    Jan. 14, 2016

Related U.S. Application Data

(63) Continuation of application No. 14/561,030, filed on Dec. 4, 2014, now Pat. No. 9,194,552, which is a
(Continued)

(51) Int. Cl.
| | |
|---|---|
| *F21S 11/00* | (2006.01) |
| *B29D 11/00* | (2006.01) |
| *E06B 9/24* | (2006.01) |
| *G02B 5/02* | (2006.01) |
| *G02B 5/18* | (2006.01) |
| *F21V 13/04* | (2006.01) |
| *G02B 17/00* | (2006.01) |
| *G02B 19/00* | (2006.01) |

(52) U.S. Cl.
CPC ............. *F21S 11/007* (2013.01); *B29D 11/00* (2013.01); *B29D 11/00663* (2013.01); *E06B 9/24* (2013.01); *F21S 11/002* (2013.01); *F21V 13/04* (2013.01); *G02B 5/0205* (2013.01); *G02B 5/0221* (2013.01); *G02B 5/0268* (2013.01); *G02B 5/0278* (2013.01); *G02B 5/1857* (2013.01); *G02B 17/006* (2013.01); *G02B 19/0019* (2013.01); *E06B 2009/2417* (2013.01); *E06B 2009/2482* (2013.01); *E06B 2009/2488* (2013.01); *G02B 2207/123* (2013.01)

(58) Field of Classification Search
CPC   F21V 11/02; F21V 11/06; F21V 13/04; F21S 11/007; F21S 11/002; G02B 5/021; G02B 2207/123
USPC ....... 359/592, 597, 599; 362/217.03, 217.05, 362/290, 299, 342, 354, 279, 300
See application file for complete search history.

(56) References Cited

U.S. PATENT DOCUMENTS

| | | |
|---|---|---|
| 596,883 A | 1/1898 | Jacobs |
| 737,979 A | 9/1903 | Wadsworth |
| (Continued) | | |

*Primary Examiner* — Christopher Mahoney

(57) ABSTRACT

An optical article for directing and distributing light including an optically transmissive layer having one or more arrays of TIR channels and a light diffusing element disposed in optical communication with the optically transmissive layer. The TIR channels define reflective surfaces extending perpendicular or near-perpendicular to a prevailing plane of the optically transmissive layer. The TIR channels and the light diffusing element operate concurrently to redirect and redistribute a beam of light received from a light source such as daylight or an LED over a broad angular range.

19 Claims, 19 Drawing Sheets

Related U.S. Application Data continuation of application No. 13/970,337, filed on Aug. 19, 2013, now Pat. No. 8,934,173.

(60) Provisional application No. 61/691,264, filed on Aug. 21, 2012, provisional application No. 61/775,678, filed on Mar. 10, 2013.

(56) References Cited

U.S. PATENT DOCUMENTS

| | | |
|---|---|---|
| 3,096,684 A | 7/1963 | Kegg et al. |
| 2,971,083 A | 2/1967 | Phillips et al. |
| 3,940,896 A | 3/1976 | Steel |
| 4,509,825 A | 4/1985 | Otto et al. |
| 4,557,565 A | 12/1985 | Ruck et al. |
| 4,699,467 A | 10/1987 | Bartenbach et al. |
| 4,978,181 A * | 12/1990 | Inanuma ........... B32B 17/10018 359/360 |
| 4,989,952 A | 2/1991 | Edmonds |
| 5,008,791 A | 4/1991 | Caferro |
| 5,149,191 A | 9/1992 | Lewin et al. |
| 5,206,746 A | 4/1993 | Ooi |
| 5,285,315 A | 2/1994 | Stiles |
| 5,295,051 A | 3/1994 | Cowling |
| 5,528,478 A | 6/1996 | Degelmann |
| 5,650,875 A | 7/1997 | Kanada et al. |
| 5,802,784 A | 9/1998 | Federmann |
| 5,880,886 A | 3/1999 | Milner |
| 6,239,910 B1 | 5/2001 | Digert |
| 6,311,437 B1 | 11/2001 | Lorenz |
| 6,327,083 B1 * | 12/2001 | Goldenberg ......... G03B 21/625 359/453 |
| 6,367,937 B2 | 4/2002 | Koster |
| 6,417,966 B1 | 7/2002 | Moshrefzadeh |
| 6,424,406 B1 | 7/2002 | Mueller et al. |
| 6,437,921 B1 | 8/2002 | Whitehead |
| 6,542,303 B1 | 4/2003 | Oyama |
| 6,580,559 B2 | 6/2003 | Doll et al. |
| 6,616,285 B2 | 9/2003 | Milner |
| 6,700,716 B2 | 3/2004 | Sejkora |
| 6,714,352 B2 | 3/2004 | Rogers et al. |
| 6,980,728 B2 | 12/2005 | Ladstatter et al. |
| 7,070,314 B2 | 7/2006 | Edmonds |
| 7,246,924 B2 | 7/2007 | Pfund |
| 7,410,284 B2 | 8/2008 | Edmonds |
| 7,416,315 B2 | 8/2008 | Blumel |
| 7,872,801 B2 | 1/2011 | Kojima et al. |
| 8,040,610 B2 | 10/2011 | Ko et al. |
| 8,107,164 B2 | 1/2012 | Tsai |
| 8,601,757 B2 | 12/2013 | Jaster et al. |
| 8,619,363 B1 | 12/2013 | Coleman |
| 2001/0048599 A1 | 12/2001 | Hess |
| 2002/0080484 A1* | 6/2002 | Moshrefzadeh ..... G03B 21/625 359/460 |
| 2008/0291541 A1 | 11/2008 | Padiyath et al. |
| 2009/0009870 A1 | 1/2009 | Usami |
| 2010/0302479 A1* | 12/2010 | Aronson .......... B29D 11/00326 349/64 |
| 2012/0033302 A1* | 2/2012 | Suzuki ............ B29D 11/00605 359/597 |
| 2012/0268940 A1 | 10/2012 | Sahlin |
| 2013/0038928 A1 | 2/2013 | Padiyath et al. |
| 2014/0104689 A1 | 4/2014 | Padiyath et al. |

* cited by examiner

OPTICAL ARTICLE FOR DIRECTING AND DISTRIBUTING LIGHT

CROSS-REFERENCE TO RELATED APPLICATIONS

This application is a continuation of application Ser. No. 14/561,030 filed on Dec. 4, 2014, now allowed, which is a continuation of application Ser. No. 13/970,337 filed on Aug. 19, 2013, now U.S. Pat. No. 8,934,173, which claims priority from U.S. provisional application Ser. No. 61/691,264 filed on Aug. 21, 2012, incorporated herein by reference in its entirety, and U.S. provisional application Ser. No. 61/775,678 filed on Mar. 10, 2013, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates to improving natural lighting within buildings and more particularly to daylight harvesting for building interior illumination. More particularly, this invention relates to daylighting elements of a building such as glazed wall openings, wall windows, roof windows and skylights, as well as to various devices and glazing structures used for admitting and distributing daylight into the interior of a building, such as light shelves, light redirecting blinds or louvers, light diffusers, and optically transmissive plates and light guides employing total internal reflection surfaces.

2. Description of Background Art

Various optical structures for redistributing daylight into building interiors are known. At least some of such prior art devices employ planar transparent plates of glass or plastic materials which include reflective surfaces embedded between the opposing sheet surfaces and configured to reflect light by means of a total internal reflection (TIR). The use of TIR structures generally allows for much larger bend angles compared to refractive structures such as prismatic sheets or films. Large bend angles are particularly important for redistributing daylight in the interior of a building so that at least a portion of the incident daylight could be directed towards the upper portions of the interior, such as the ceiling of a room.

For example, one such light redirecting structure employing internal TIR surfaces is disclosed in U.S. Pat. No. 737,979 which shows a glass plate including a series of parallel slots made in its body. The angle of these slots is such that daylight coming from any given principal direction from outside is reflected from the surface of the slot and is hereby redirected from its original propagation path. Another light redirecting structure is disclosed in U.S. Pat. No. 6,424,406 which describes optical diffuser plates made from transparent plastics and employing either thin strips of another plastic or hollows in the respective plates to deflect light.

U.S. Pat. No. 7,416,315 discloses a faceted reflector which includes a plurality of parallel prismatic reflectors embedded in a carrier and reflecting light by total reflection at a part of the cavity interfaces. In U.S. Pat. No. 6,616,285, total reflection surfaces are formed by merging two optical bodies each having surface groves which interpenetrate into one another when such bodies are placed face-to face. U.S. Pat. No. 5,880,886 shows V-section grooves formed in a major face of a substantially flat and planar optical element. U.S. Pat. No. 4,557,565 discloses a planar solid transparent light deflecting panel or plate for transmitting sunlight into the interior of a building. The panel or plate is formed of a plurality of parallel identically spaced apart triangular ribs on one face. The ribs have specially selected slopes to totally internally reflect light when such panel or plate is placed over an opening such as window.

On the other hand, various methods of making the light redirecting TIR structures in such transparent plates have been proposed. For example, U.S. Pat. No. 4,989,952 discloses a method for producing a transparent light deflecting panel comprising making a series of parallel cuts in a sheet of transparent solid material with a laser cutting tool. Such panel can be positioned in an opening in the facade of a building to deflect incident daylight towards the ceiling thereby improving the natural lighting within the building. The transparent sheet is commonly acrylic and the laser tool is a carbon dioxide ($CO_2$) laser.

U.S. Pat. No. 6,580,559 describes a method of forming internal TIR structures in transparent panels made from glass-like thermoplastic material such as PMMA by inducing parallel crazes in the thermoplastic material. An organic solvent is applied on the panel surface while a tensile stress is applied to a panel which results in generation of wedge-shaped deformations (crazes) which propagate within the material. However, such method of forming internal TIR structures offers little control over the spacing, depth and extent of the crazes, as well as can substantially compromise the structural integrity or rigidity of the panel.

However, the use of prior art light redirecting devices for daylighting purposes can be deficient in that such devices only provide light redirection in one angular dimension, whereas the significant seasonal and hourly positional changes of the sun are two-dimensional (i.e., changes in the elevation and azimuth angle). Thus, many daylighting systems would benefit from employing a sheet-form light redirecting structure that can provide large bend angles in more than one angular dimensions and thus provide a more uniform and broad distribution of daylight in the building interior. On the other hand, such daylighting systems will also benefit from providing additional means for light diffusion which would even further improve light distribution and reduce apparent glare.

These needs and others are met within the present invention, which provides an improved sheet-form structure for illuminating building interiors with sunlight and also provides a method of making the same. The improved sheet-form structure employs internal reflective surfaces disposed in an arrangement which is more efficient for redirecting and distributing sunlight incident from a broad range of directions.

BRIEF SUMMARY OF THE INVENTION

The present invention solves a number of daylight harvesting and distribution problems within a planar and compact sheet-form optical system which can be used in window glazing and skylights.

In one embodiment, an optical article is described for directing and distributing daylight within building interior using an optically transmissive sheet material in which light redirecting functionality is provided by two intersecting arrays of parallel channels formed in one or both major surfaces of the sheet. Each channel has a high aspect ratio (the ratio between the depth and width of the channel) and includes two opposing side walls having generally smooth surfaces configured for reflecting light by means of a Total Internal Reflection (TIR). The propagation of an off-axis light beam through such sheet results in splitting the incident beam onto two or more light beams which propagate towards different directions. Due to employing internal reflection, the angular spread of the emerging beam can be quite broad, depending on the incidence angle. Each of the intersecting arrays of parallel TIR channels redirect light in the respective reflective planes so that the incident beam can be redirected and split in both angular dimensions. Thus, when such light redirecting optical article is incorporated into a skylight or fenestration system, the direct beam of sunlight can pass through the sheet-form material configured with internal TIR surfaces and at least a portion of the solar beam can be redirected into building interior at high deflection angles with respect to the incident direction. At least one broad-area surface of the optically transmissive sheet may be provided with light-diffusing surface relief features. Alternatively, or in addition to that, a broad-area light diffusing element may be provided and optically coupled to a major surface of the sheet.

In at least one implementation, the thickness of the optically transmissive sheet is between 1.5 mm and 30 mm. In at least one implementation, such sheet has a rectangular shape and is made from Poly(methyl methacrylate).

There are various ways in which the intersecting arrays of TIR-enabled channels may be formed and positioned with respect to each other. In one implementation, one array of parallel channels may be formed in one broad-area surface of the sheet and the other array may be formed in the same surface. In an alternative implementation, one array of parallel channels may be formed in one broad-area surface of the sheet and the other array may be formed in the opposite surface. In at least one implementation, the longitudinal axis of the two arrays may be crossed at a right angle.

The geometry of light-redirecting channels may be configured in a number of ways. In at least one implementation, at least one side wall of each channel is planar. In at least one implementation, at least one of such side walls has a curvilinear cross-sectional profile. In at least one implementation, at least one of the side walls of each channel extends generally perpendicular to the prevailing plane of the optically transmissive sheet. In at least one implementation, at least one of the side walls of each channel makes a dihedral angle with one of the surfaces of the sheet which is greater than 80 degrees and less than 90 degrees. In various implementations, the dihedral angle may be constant or can be made variable across the sheet surface. In at least one implementation, each of the channels has a generally V-shaped transversal profile. In at least one implementation, each of the channels has a generally deep-drawn U-shaped transversal profile.

In at least one implementation, at least one of the surfaces of the optically transmissive sheet is provided with light-diffusing surface relief features and such features are selected from the group of optical elements consisting of microlenses, microprisms, and matte surface texture.

In at least one implementation, the TIR channels are formed in the optically transmissive sheet by laser cutting.

In one embodiment, the optical article is described for directing and distributing daylight within building interior using a specularly reflective grid and a light diffusing sheet disposed in energy exchange relationship with the reflective grid. The reflective grid includes a rectangular grid of mirrored walls. Each mirrored wall longitudinally extends parallel to the prevailing plane of the panel and transversally extends perpendicularly or nearly perpendicularly to such plane. The grid of intersecting mirrored walls creates an array of light channeling cells which redirect at least a portion of off-axis rays thus splitting an incident parallel beam into two or more beams distributed over a broad angular range. The light diffusing sheet is configured to provide a further spread to the direct beam. In at least one implementation, the light diffusing sheet is disposed on the light path before the reflective grid. In at least one implementation, the light diffusing sheet is disposed on the light path after the reflective grid. In at least one implementation, the reflective grid is sandwiched between opposing parallel diffusing sheets.

In one embodiment, the optical article is described to be incorporated into a skylight. The optical article is configured to receive light collected by the skylight and redistribute such light within building interior so as to provide a broader singular spread at least for off-axis solar rays.

In one embodiment, a method of manufacturing a light redirecting optical article comprising a sheet of optically transmissive rigid material is described. The method includes the steps of laser-cutting a first array of parallel channels along a first direction using a CO2 laser and laser-cutting a second array of parallel channels along a second direction, where the first and second directions are perpendicular to each other.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and method generally shown in the preceding figures. It will be appreciated that the apparatus and method may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

The present invention particularly seeks to provide illumination components capable of receiving daylight entering building interiors through various openings, such as wall windows, roof windows, doors and skylights and redistributing such daylight for improved daylighting efficiency, more uniform spatial distribution and reduced glare. Daylight is generally referred to both the direct and indirect sunlight striking the respective openings in buildings during the daytime. The direct sunlight represents a quasi-parallel beam from the sun and the indirect sunlight represents the diffuse solar radiation scattered out of the direct beam by the sky and various outdoor objects. While the operation of the following embodiments is primarily described by example of the direct sunlight, it should be understood that this invention may also be applied for admitting and redistributing the diffuse component of sunlight within a building interior.

A first embodiment of the present invention is directed to a sheet-form of optically transmissive, solid dielectric material which includes a plurality of TIR reflectors formed between its opposing broad-area surfaces and arranged in a grid pattern. Suitable sheet-form representations of the body of the material may include a panel, slab or film in which the material thickness is substantially less than the other two dimensions. While the preferred embodiments are described upon the case of a rectangular sheet-form, it should be understood that this invention is also applicable to any two-dimensional shape variations of the sheetforms, including but not limited to a rectangle, a polygon, a circle, a strip, a freeform, or any combination therein. This invention is further applicable to any three-dimensional shapes that can be obtained by bending the sheetforms accordingly, including but not limited to cylindrical or semi-cylindrical shapes, conical shapes, corrugated shapes, and the like.

Figure 1:
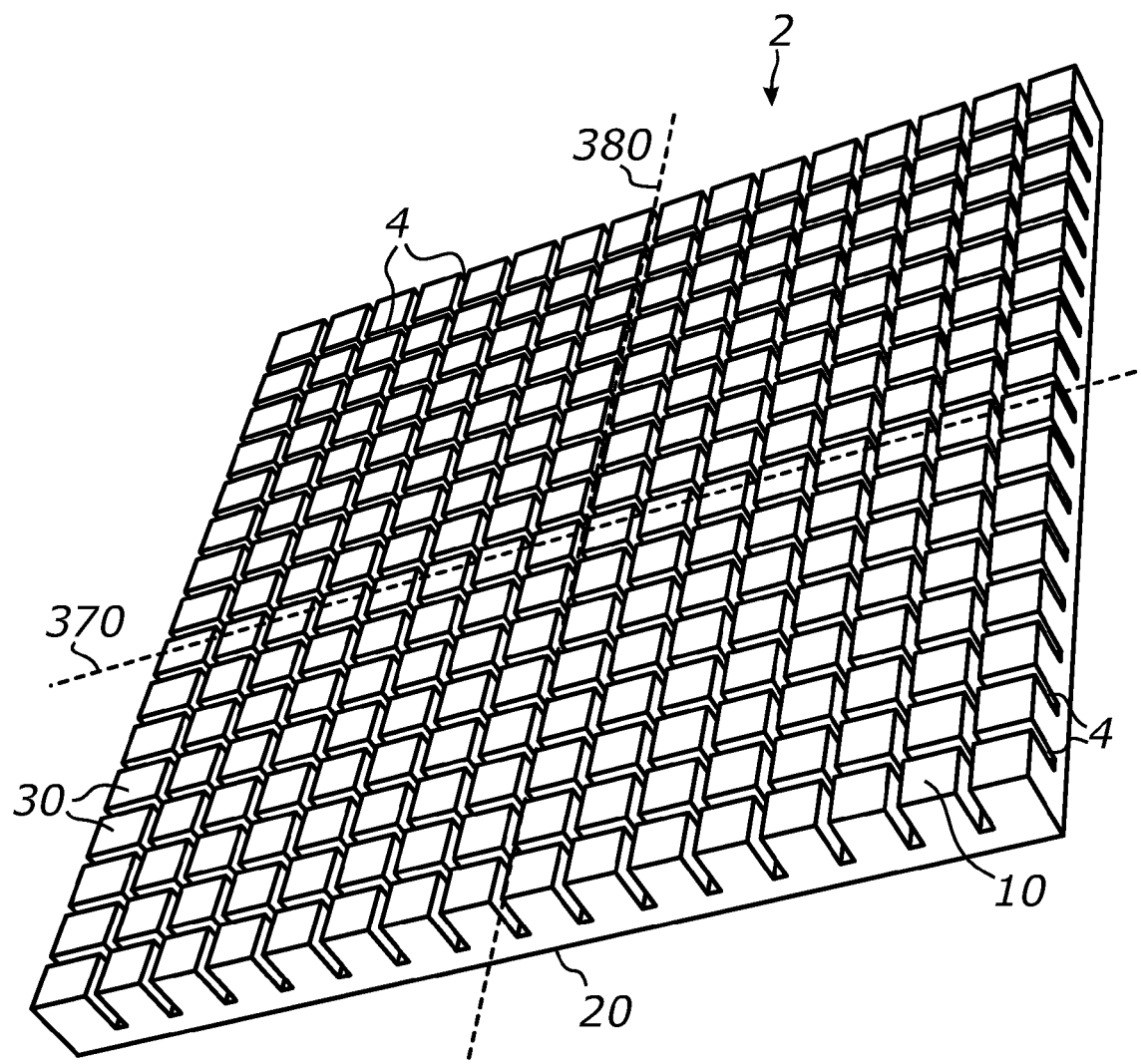
FIG. 1 is a schematic perspective view of an optical article for illuminating building interiors with sunlight, according to at least one embodiment of the present invention.

FIG. 1 illustrates such an embodiment of an optical article exemplified by a rectangular planar sheet 2 of optically clear polymeric material. Sheet 2 is defined by opposing major surfaces 10 and 20. Such surfaces 10 and 20 extend parallel to each other so that sheet 2 has a generally constant thickness. It is preferred that the thickness of sheet 2 is considerably smaller than the length and width of the sheet. Particularly, it may be preferred that the thickness of sheet 2 is between 1.5 mm and 30 mm while the length and width of sheet 2 may extend from several centimeters to several meters.

Sheet 2 includes a plurality of channels 4 formed in broad-area surface 10. Each channel 4 forms at least two side walls extending transversely between surfaces 10 and 20 of sheet 2.

Each channel 4 should be sufficiently narrow so that the spacing between the adjacent channels is considerably greater than the width of the channel. At the same time, each channel 4 should preferably have a relatively high aspect ratio. The aspect ratio may be defined as the ratio between the depth of the channel 4 and width of the channel at its base in surface 10. The aspect ratio of channels 4 is preferred to be greater than five and, more preferably, at least ten or more. Similarly, the spacing between adjacent channels 4 is preferred to be greater than the width of each channel by at least five times or more.

Figure 2:
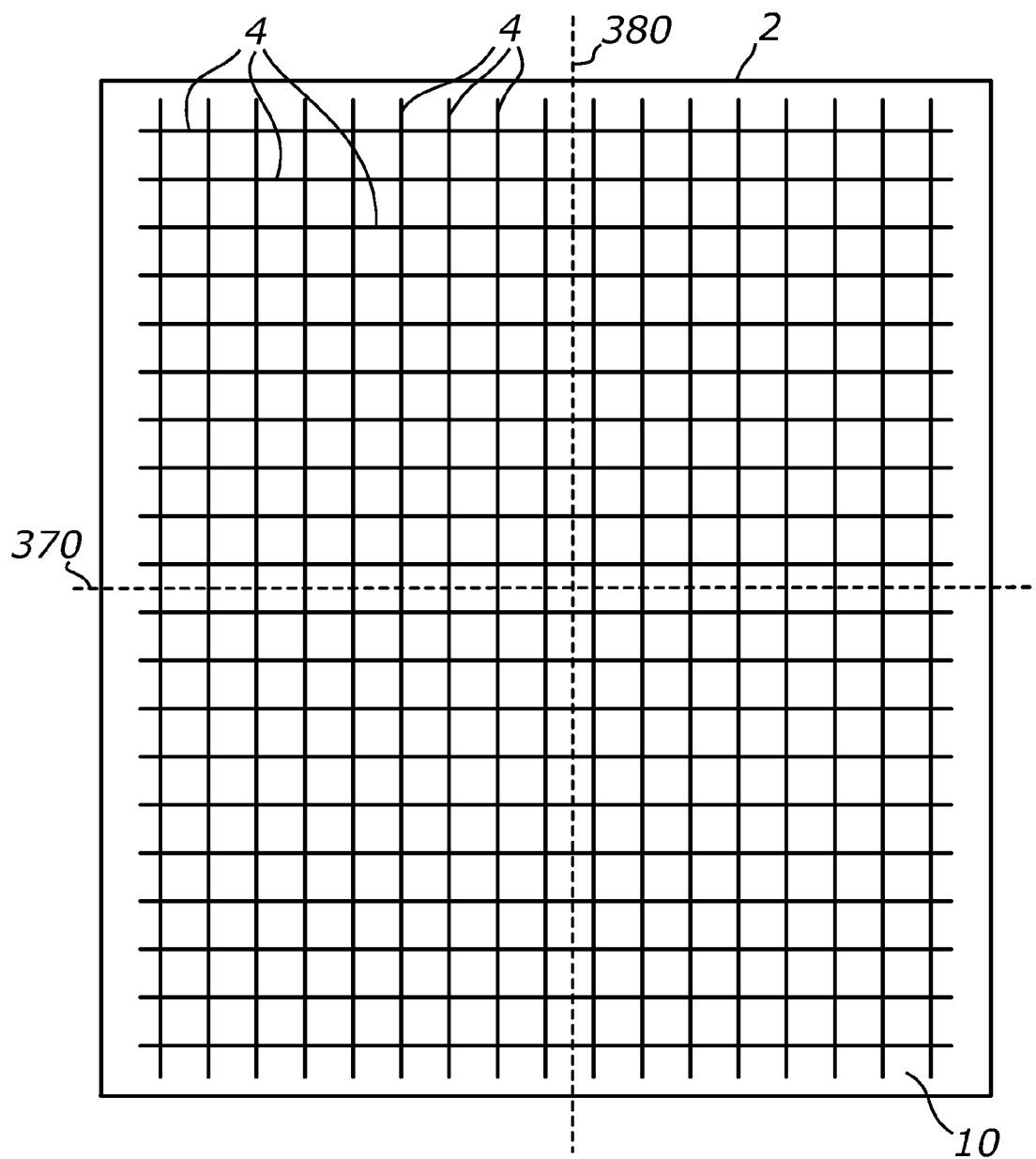
FIG. 2 is a schematic view of an optical article for illuminating building interiors with sunlight, showing an exemplary grid arrangement of channels in a surface, according to at least one embodiment of the present invention.

Channels 4 are arranged in two arrays which are crossed at an angle with respect to one another so that a grid of channels 4 is formed in surface 10. In a first parallel array, channels 4 longitudinally extend parallel to a reference line 370 which is hereinafter referred to as a longitudinal axis of the first array. In a second parallel array, channels 4 extend parallel to a reference line 380 which is hereinafter referred to as a longitudinal axis of the second array. In a preferred embodiment illustrated in FIG. 1, longitudinal axis 370 of the first parallel array is perpendicular to longitudinal axis 380 of the second parallel array so that the grid of channels 4 is rectangular (see also FIG. 2).

Channels 4 should be formed so that their walls extend into the material of sheet 2 perpendicularly or near-perpendicularly to surfaces 10 and 20. The surfaces of such walls should preferably be made smooth and capable of internally reflecting light by a Total Internal Reflection (TIR). Accordingly, the grid of intersecting arrays of channels 4 may form a plurality of light-channeling cells 30. Each light-channeling cell 30 will have a shape of rectangular parallelepiped defined by four vertical (with respect to a horizontally disposed sheet 2) walls of intersecting channels 4 and a horizontal terminal wall represented by an uncut portion of surface 10.

It will be appreciated by these skilled in the art that forming narrow, high-aspect-ratio channels with vertical walls may be difficult with most industrial processes. Therefore, the preferred embodiments of the present invention also include the cases where the walls of channels 4 extend transversely through sheet 2 at angles which are not exactly perpendicular to surface 10 but fairly close to being perpendicular.

Figure 3:
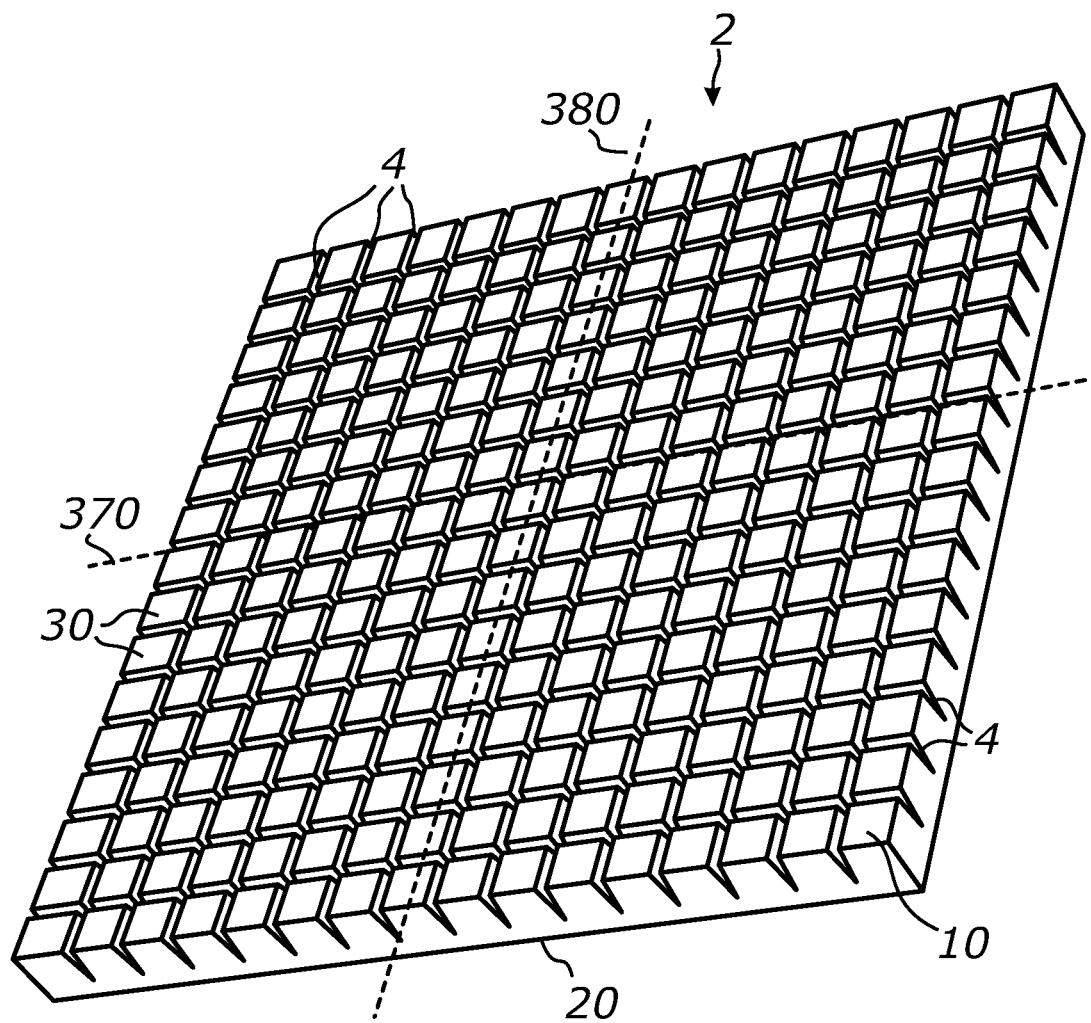
FIG. 3 is a schematic perspective view of an optical article, showing a grid of intersecting channels each having a deep-drawn V-groove shape, according to at least one embodiment of the present invention.
Figure 4:
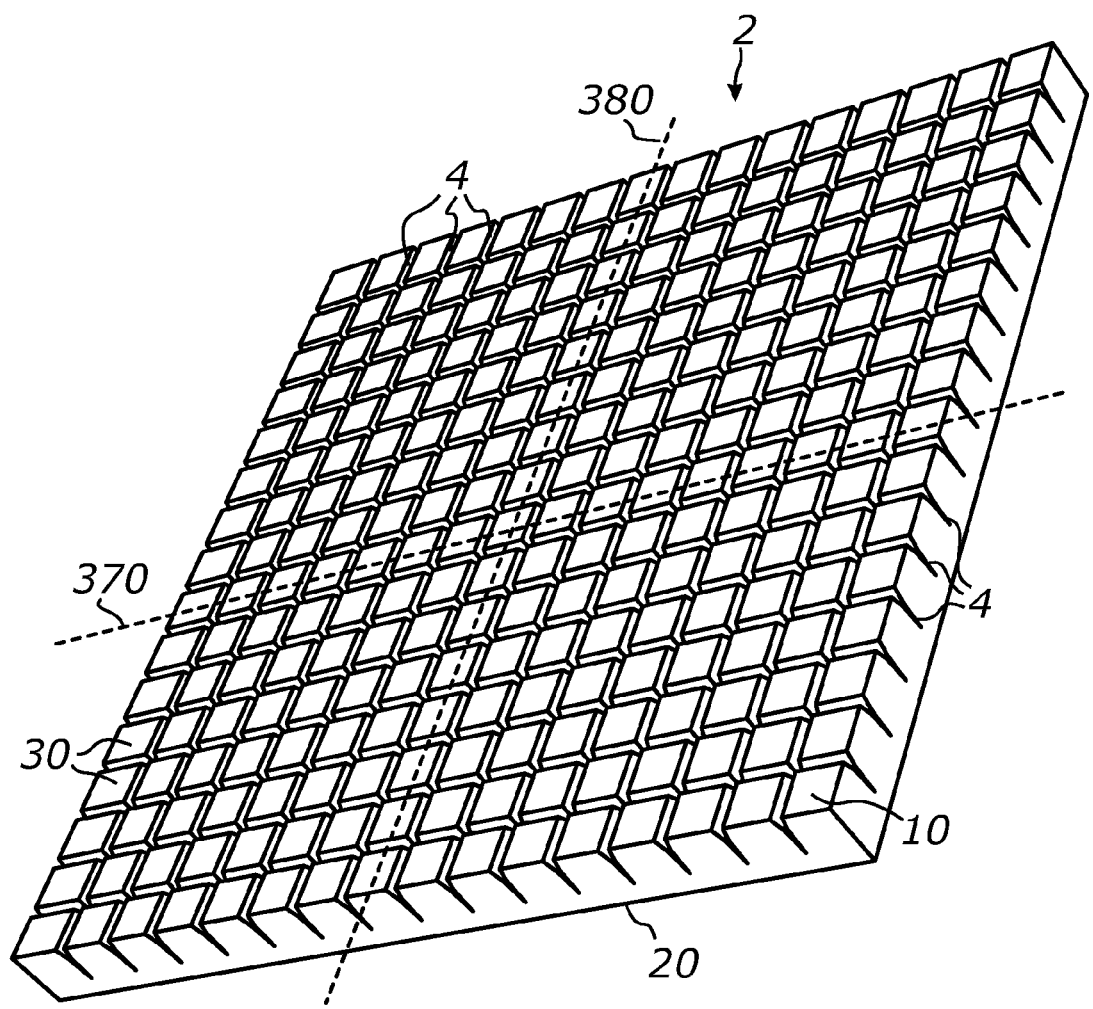
FIG. 4 is a schematic perspective view of an optical article, showing a grid of intersecting channels each having a narrow funnel-shaped cross-sectional profile with curvilinear walls, according to at least one embodiment of the present invention.

Such cases are illustrated in FIG. 3 and FIG. 4 where the walls of channels 4 form a relatively low angle (within a predetermined maximum angular value) with respect to a normal to surface 10.

FIG. 3 shows an implementation of sheet 2 where channels 4 have sloped walls and form narrow V-grooves in surface 10. Accordingly, each light-channeling cell 30 of FIG. 3 will be shaped in the form of a square frustum (truncated pyramid with a rectangular base) with near-parallel side walls.

In FIG. 4, the walls formed by each channel 4 are curvilinear in a cross-section perpendicular to the longitudinal axis of the channel. Accordingly, each light-channeling cell 30 of FIG. 4 has slightly curved side walls which will still be nearly perpendicular to surface 10.

According to a preferred embodiment, sheet 2 can be made from Poly(methyl methacrylate) which is also generally referred to as PMMA, acrylic or acrylic glass. However, it should be understood that any other optically-clear plastic material having the sufficient thickness to support the formation of channels 4 may also be used for making sheet 2.

A suitable method of forming narrow, high-aspect-ratio channels 4 channels 4 in surface 10 may include laser ablation using a $CO_2$ laser operating at 10.6 µm. $CO_2$ lasers are well known in the art to be able to produce deep micro-channels with fairly smooth, heat-polished edges in PMMA materials. Other methods may also include molding, embossing and various forms of microreplication in which case a suitable mold may be provided with an array of high-aspect-ratio protrusions representing a negative replica of the channels 4 to be formed.

Figure 5:
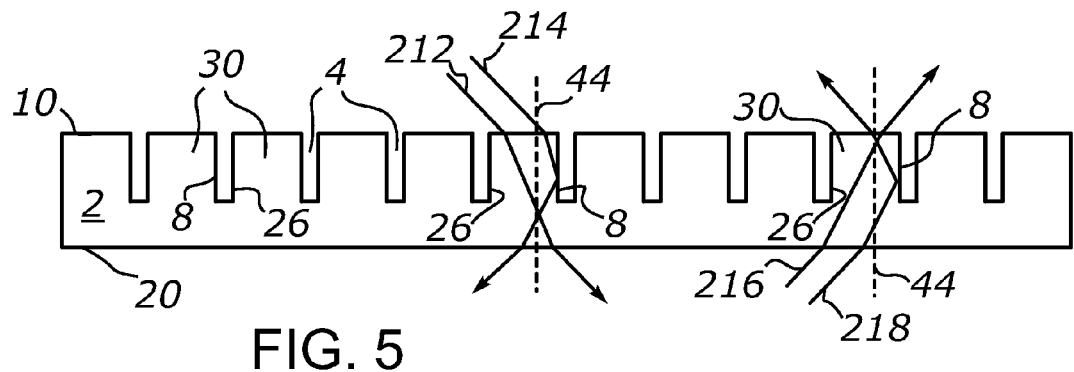
FIG. 5 is a schematic cross-sectional view and raytracing of a light redirecting optical article, showing TIR reflective walls which are perpendicular to the major surfaces of an optically transmissive layer, according to at least one embodiment of the present invention.

FIG. 5 illustrates further details and operation of the optical article shown in FIG. 1 and depicts a cross-section of sheet 2 along reference line 370. In such cross-section, each channel 4 of FIG. 5 has a deep-drawn U-shape and includes a first planar wall 8 and an opposing second planar wall 26. Walls 8 and 26 pairwise define individual light-channeling cells 30.

The generally planar configuration of sheet 2 may be characterized by a prevailing plane of the sheet and a normal 44 to such plane. Obviously, due to the parallelism of surfaces 10 and 12 normal 44 is also a normal to both of these surfaces. Accordingly, each of the walls of channels 4 has a linear cross-sectional profile extending between surface 10 and 20 along normal 44. Each light-channeling cell 30 thus has a rectangular cross-section protruding away from the body of sheet 2. The depth of each channel 4 should preferably be substantially greater than its width so that cells 30 are disposed sufficiently close to each other. In other words, the air gaps between the individual cells should preferably be substantially smaller than the size of each cell 30.

Each of the side walls 8 and 26 of channels 4 should be configured for light redirection by means of the Total Internal Reflection (TIR). It will be appreciated by those skilled in the art that TIR would normally occur at a smooth optical interface between a first light transmitting material having a greater refractive index and a second light transmitting material having a lower refractive index when the angle of incidence is greater than the critical TIR angle characterizing such interface. Accordingly, in order to provide TIR reflectivity, the surface of walls 8 and 26 should be generally smooth with glossy, polished appearance.

In operation, an off-axis ray 212 striking the light receiving aperture of cell 30 at surface 10 bends into the bulk material of sheet 2 by means of refraction, passes through the body of the sheet and emerges from the opposite surface 20, also undergoing refraction. It will be appreciated by those skilled in the art that, when surface 10 and 20 are parallel and when ray 212 encounters no obstacles on its light path within the transmissive layer of sheet 2, it will emerge from surface 20 at essentially the same exit angle as the angle of incidence.

For the purpose of explaining the best modes of operation of the present invention, the term "off-axis" is generally directed to mean light incidence onto a surface at angles other than normal to the surface. From the practical considerations, when a ray or a parallel beam of light makes an angle with respect to the surface close to 90° but is not exactly normal to the surface, such incidence may still be considered on-axis. In contrast, in order to be considered off-axis, the ray ore a beam should deviate notably from the normal to the surface in order to be considered off-axis. Since the incidence angle is customarily measured off a normal to the surface, the on-axis rays will generally have zero or near-zero incidence angle and the off-axis rays will generally have non-zero angles in the −90° to 90° range in a plane of incidence.

Another off-axis ray 214 initially propagating parallel to ray 212 strikes the entrance aperture of the same cell 30 but at a different location along the surface. Wall 8 of one of channels 4 lies on the optical path of ray 214 which causes redirection of ray 214 by means of TIR from wall 8. Since wall 8 is perpendicular to surface 10 and the angle of reflection is equal to the angle of incidence as a matter of optics, the propagation direction of ray 214 after TIR will mirror that of ray 212 relatively to normal 44. Thus, ray 214 will emerge from surface 20 at the same angle with respect to normal 44 except that the exit angle will have an opposite sign compared to ray 212. Therefore, the optical article of FIG. 5 will effectively redistribute an off-axis parallel beam of incident light into at least two beams which propagation directions include opposing quadrants or hemispheres with respect to normal 44 in the plane of reflection of such off-axis beam.

The use of TIR to redirect at least a portion of light toward the opposing edge of sheet 2 promotes a broader angular distribution of light compared to refraction-only diffusers and can help illuminate portions of the building interiors more efficiently than would otherwise be possible with prior-art designs. It will be appreciated that, since TIR is practically lossless, sheet 2 can be designed so that its light transmission remains relatively high and comparable to the transmission of a raw polished sheet of the same material.

Without departing from the operation principle described by example of rays 212 and 214, sheet 2 may also be operated in a reverse configuration in which light is received by the opposing surface 20 of sheet 2 and exits from surface 10. This is illustrated by example of rays 216 and 218 in FIG. 5. Ray 216 enters sheet 2 through surface 20 and emerges from opposing surface 10 undergoing refraction at each optical interface it encounters. Since ray 216 does not encounter any TIR interfaces, it maintains the initial propagation direction after passing through sheet 2. In contrast, parallel ray 218 impinging onto surface 20 at a slightly different location enters the light receiving aperture of cell 30 and strikes TIR wall 8 of channel 4. Similarly to ray 214, ray 218 is reflected from wall 8 by means of TIR and emerges from surface 10 into an opposing hemisphere with respect to surface normal 44 compared to the case where ray 218 would have propagated in the absence of wall 8. Accordingly, rays 216 and 218 incident into sheet 2 from a single quadrant or hemisphere with respect to the surface normal (in the plane of reflection), are redirected into opposing quadrants or hemispheres with respect to the same normal.

Figure 6:
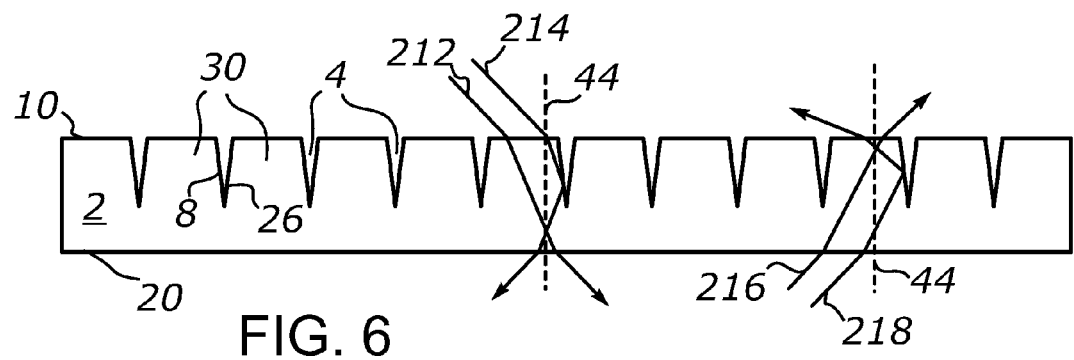
FIG. 6 is a schematic cross-sectional view and raytracing of a light redirecting optical article, showing an alternative profile of channels in an optically transmissive layer, according to at least one embodiment of the present invention.

FIG. 6 illustrates the operation principle of sheet 2 of FIG. 3 in which channels 4 are formed by V-shaped grooves in surface 10. Accordingly, the pairs of parallel rays 212, 214 and 216, 218 are redistributed within sheet 2 so that the respective rays emerge towards diverging directions and towards the opposing sides of sheet 2 with respect to surface normal 44. It will be understood that, since walls 8 of channels 4 are sloped with respect to normal 44, the angles that rays 214 and 218 make with normal 44 upon reflecting from wall 8 will generally not be the same as those before the reflection. Nevertheless, when the slope of walls 8 and 26 is sufficiently small, as in an exemplary case of deep drawn, narrow channels in the surface of sheet 2, the angle difference in light propagation between FIG. 5 and FIG. 6 will also be relatively small.

Figure 7:
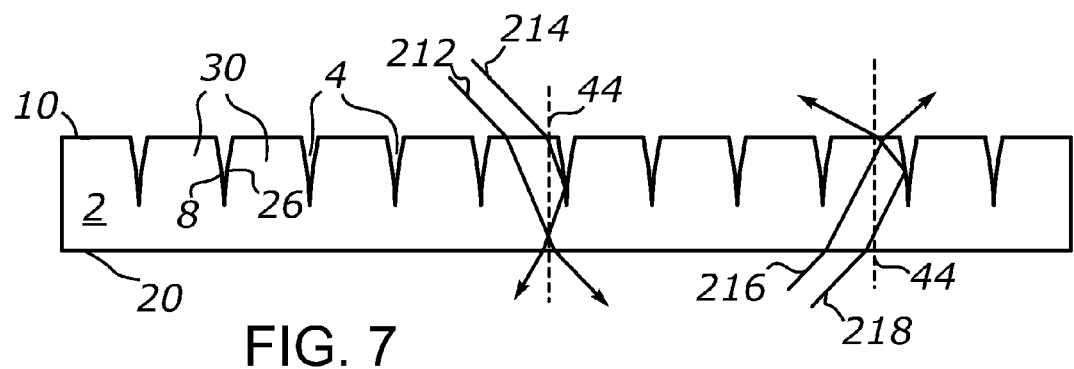
FIG. 7 is a schematic cross-sectional view and raytracing of a light redirecting optical article, showing a further alternative profile of channels in an optically transmissive layer, according to at least one embodiment of the present invention.

FIG. 7 illustrates a yet further example of sheet 2 operation where channels 4 have cuspated transversal profiles with curvilinear walls 8 and 26, similarly to the case illustrated in FIG. 4. Such cuspated profiles of channels 4 may be formed naturally, for example, in the process of direct laser ablation. Similarly to the above-described examples, as illustrated by the light paths of rays 212, 214 and 216, 218 in FIG. 7, a beam of parallel light can be redistributed across a large angular range due to redirecting at least a portion of the incident beam using TIR reflectors between surfaces 10 and 20. Curviliner walls of channels 4 may also be advantageously selected for the purpose of additional diffusion of light passing through sheet 2.

Figure 8:
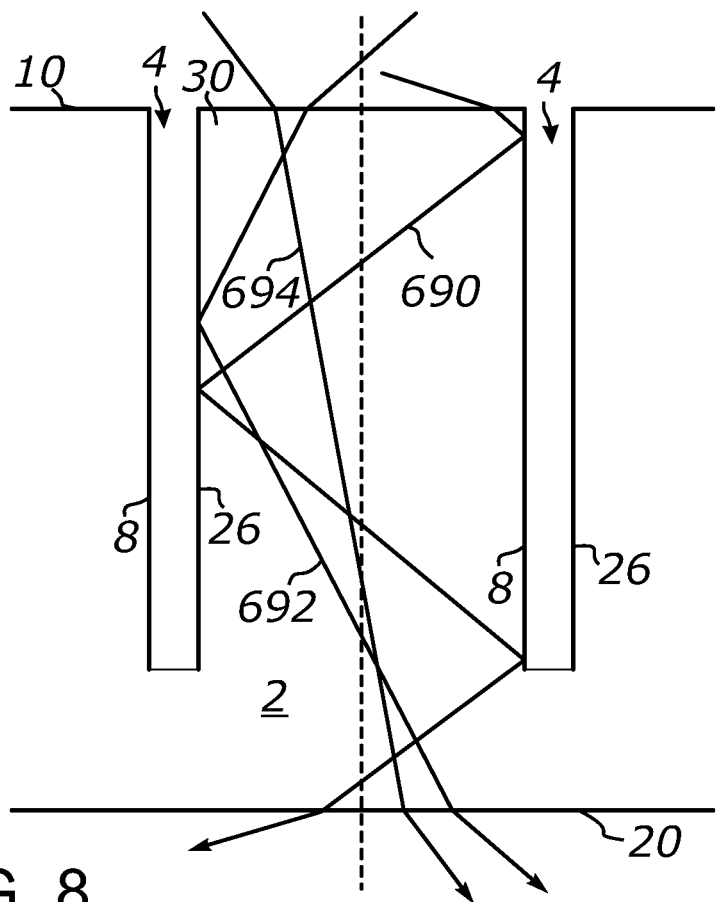
FIG. 8 is a schematic cross-sectional view and raytracing of a portion of a light redirecting optical article, further showing various ray paths through a light-channeling cell, according to at least one embodiment of the present invention.

It is noted that the light redirecting operation of sheet 2 is not limited to light reflection from just one wall of the respective cells 30. Particularly, the aspect ratio of cells 30 can be made sufficiently high to enable multiple bounces of light rays from opposing walls thus providing a light-channeling or light-guiding function. This is illustrated in FIG. 8 in which an exemplary off-axis ray 690 is shown reflecting from the TIR walls of cell 30 three times while another ray 692 undergoes only a single reflection. At least some other rays (such as a ray 694 shown in FIG. 8), especially those having relatively low off-axis deviations, may also pass through cell 30 without interacting with any of the TIR walls. In the illustrated example, each cell 30 may operate as a kaleidoscopic light pipe for at least off-axis rays. It will be appreciated that, when cell 30 is exposed to a beam of light which can be represented by a large number of off-axis rays, such rays will randomly mix within cell 30 and emerge from surface 20 with random angular and spatial distribution. Some rays may exit towards one edge of sheet 2 and other rays may exit towards the opposing edge. Thus, sheet 2 employing such high-aspect-ratio cells 30 may be used for improved diffusion and distribution of daylight incident from different angles onto the optical article in response to the diurnal and/or seasonal motion of the sun.

Figure 9:
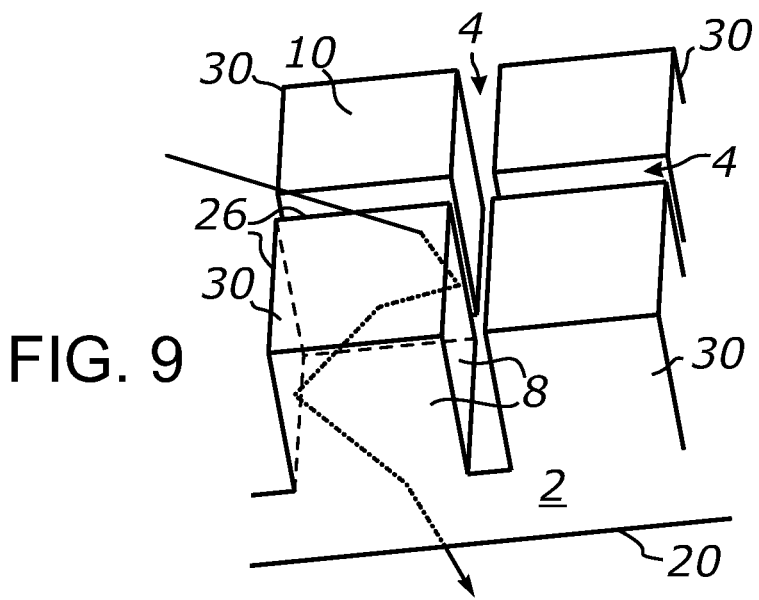
FIG. 9 is a schematic perspective view and raytracing of a portion of a light redirecting optical article, showing an exemplary path of a ray reflecting from multiple walls of a light-channeling cell, according to at least one embodiment of the present invention.

It is further noted that the light-channeling operation of individual cells 30 is not limited to reflecting light from the opposing parallel TIR walls in one plane. FIG. 9 illustrates an exemplary ray path through cell 30 where such ray enters surface 10 from a random off-axis direction. In the illustrated case, the incident ray makes non-zero angles with each of the side walls of the respective light-channeling cell 30. As it can be seen, the off-axis ray can be sequentially reflected from two or more of the four side walls of light-channeling cell 30 thus obtaining a random emergence angle from surface 20. Accordingly, the light-redirecting optical article of this invention may be configured to provide two-dimensional randomization of the light paths and thus provide an improved light beam spread and homogenization for a broad range of incidence angles.

Figure 10:
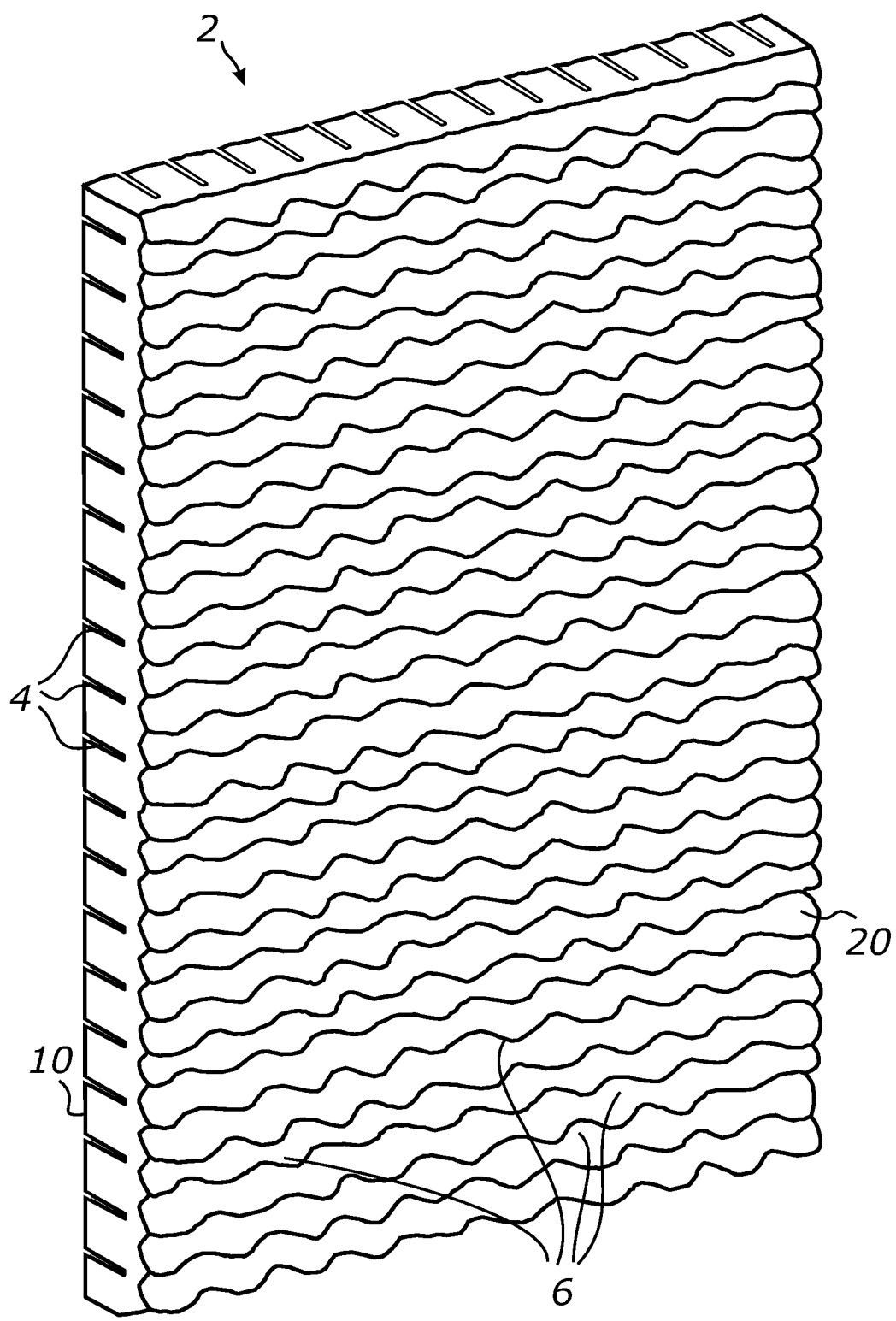
FIG. 10 is a schematic view of an optical article for illuminating building interiors with sunlight, showing surface microstructures in a broad-area surface of an optically transmissive sheetform material, according to at least one embodiment of the present invention.

Sheet 2 may be provided with additional means for light diffusion and/or beam dispersion. FIG. 10 shows sheet 2 in which surface 20 has light-diffusing microstructure exemplified by random surface relief features 6. The light-diffusing microstructure may have any 2-dimensional or 3-dimensional geometry configured for dispersing or scattering a parallel beam of light by means of refracting its rays towards different directions. Any useful type of surface microstructure may be used. Representative refractive micrustructures may include but are not limited to prism arrays, arrays of prisms, lens arrays, engineered surfaces or various surface relief types commonly referred to as "frosted-glass", "prismatic", "sanded", "pebble", "ice", "matte", "microprism", "microlens", and the like. Alternatively or in addition to that, surface 20 may have any decorative or ornamental microstructured features such as, for example, those found in some decorative or privacy panels and films.

Any conventional means used to pattern the surface of thermoplastic sheets or films may be used to form the textured surface 20. These may include but are not limited to engraving, microreplication from a master mold, etching, embossing, stamping, laser patterning, sanding, etching, and the like. The required texture may also be ordinarily obtained by replication in a UV-curable material on a suitable optically transmissive substrate.

Figure 11:
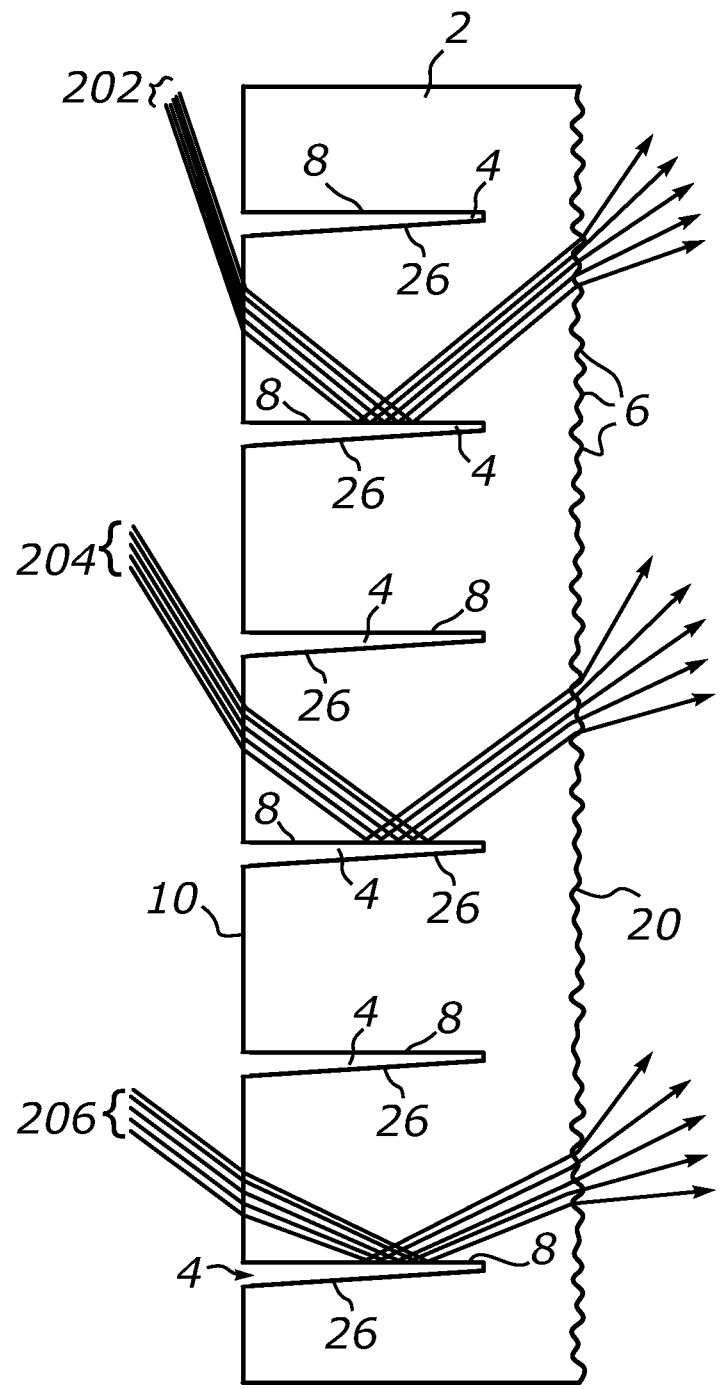
FIG. 11 is a schematic cross-sectional view and raytracing of a portion of a light redirecting optical article, illustrating the operation of TIR surfaces and light-diffusing surface relief features, according to at least one embodiment of the present invention.

FIG. 11 illustrates the operation of the system depicted in FIG. 10. Referring to FIG. 11, a quasi-parallel ray bundle 202 illustratively represents a direct beam of sunlight striking the outer surface 10 of sheet 2 from an off-axis direction. Ray bundle 202 is reflected by side wall 8 of one of the channels 4 by means of TIR and exits from the microstructured surface 20 of sheet 2. Surface relief features 6 ensure that light rays in ray bundle 202 make random incidence angles with the light output surface 20 and are thus dispersed over a certain angular range. The angle of dispersion may be controlled by the shape and distribution pattern of surface relief features 6. Other ray bundles 204 and 206 which exemplify direct sunlight at different solar elevations are similarly redirected by reflection from the respective side walls 8 of channels 4 and exit from the textured light-output surface 20.

While the prevailing emergence angle of ray bundles 202, 204 and 206 from sheet 2 may differ from each other due to the difference in the incidence angle onto the light input surface 10, the redirected solar radiation will generally be redistributed over a relatively broad angular range in either case due to the light diffusing function of surface 20. It will be appreciated that such light diffusion may enhance the daylighting experience for the building occupants by improving daylight distribution and reducing the glare associated with direct sunlight.

Figure 12:
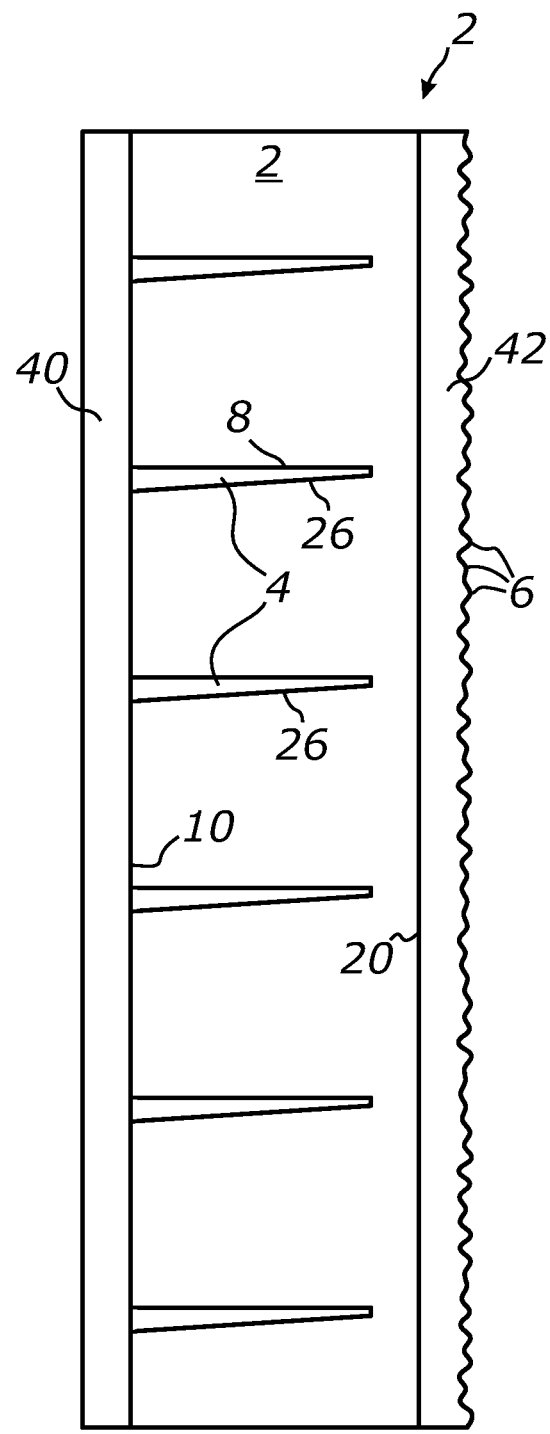
FIG. 12 is a schematic cross-sectional view of a light redirecting optical article comprising additional layers of an optically transmissive material, according to at least one embodiment of the present invention.

Sheet 2 may comprise any number of additional internal or external layers that can have various functions. Particularly, a layer of optically transmissive material may be provided on one or both sides of sheet 2. This is illustrated in FIG. 12 showing a transparent layer 40 attached to surface 10. By way of example and not limitation, layer 40 may be used to provide protective encapsulation of channels 4. Such encapsulation can help prevent dust, dirt and/or moisture accumulation in channels 4. Layer 40 may be attached to surface 10 using a pressure sensitive adhesive, a heat-activated adhesive, moisture-activated-adhesive, UV- or hear-curable adhesive, static cling, or by any other suitable means. In a further example, layer 40 itself may be formed by an optically clear adhesive. This may be useful, for instance for the case when sheet 2 is intended to be laminated onto an external substrate.

As further illustrated in FIG. 12, a layer 42 of optically transmissive material may be applied to the opposing surface 20. When a textured surface is desired for the optical article, surface relief features 6 may be formed in such external layer 42. In an illustrative example, layer 42 may be initially formed separately from sheet 2 and then laminated to surface 20 of the sheet using a pressure sensitive or hot-melt adhesive. Any such external layers applied to sheet 2 may also be provided with UV- or IR-blocking properties. Alternatively, or in addition to that, any of the layers may be provided with color filtering properties or tint.

Sheet 2 may incorporate any masking elements, for example, to block portions of light from propagating into the building interior. Furthermore, sheet 2 may incorporate any number of auxiliary layers serving various additional purposes, such as, for example, providing additional mechanical strength, environmental resistance, peel resistance, improved visual appearance, decorative appearance, etc. Any optical interface between optically transmissive layers may also include an intermediate optically transmissive layer, for example, for promoting the optical contact or adhesion between the layers.

The optical article of the present invention may further incorporate various color filters, inks, dyes or other devices or substances that change the color of the light upon passage through sheet 2. Sheet 2 may also incorporate light filtering or light rejecting elements, polarizing elements, fluorescent elements, light scattering or diffusing elements and the like, which may be provided as separate layers or incorporated into the bulk material of the sheet.

Figure 13:
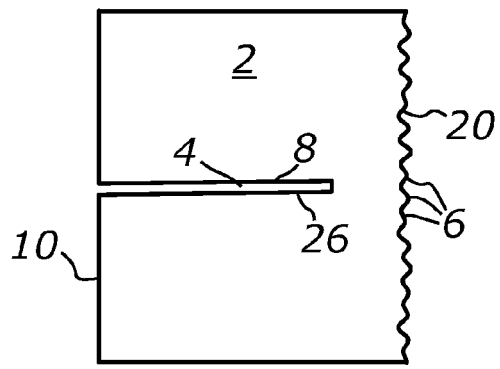
FIG. 13 is a schematic cross-sectional view of a portion of a light redirecting optical article, showing a straight channel having walls extending perpendicular to opposing broad-area surfaces, according to at least one embodiment of the present invention.
Figure 14:
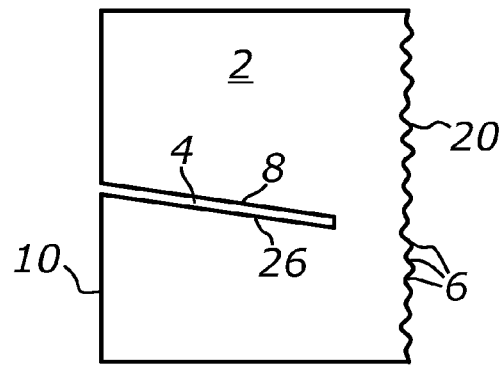
FIG. 14 is a schematic cross-sectional view of a portion of a light redirecting optical article, showing a partial sloped channel, according to at least one embodiment of the present invention.
Figure 15:
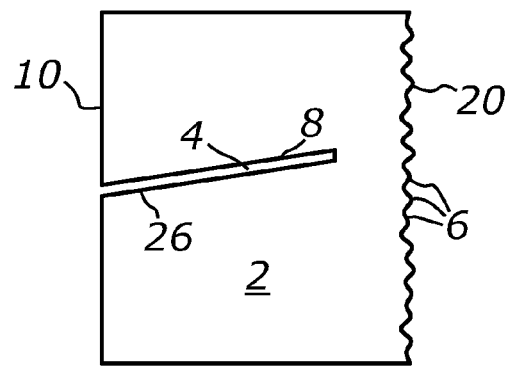
FIG. 15 is a schematic cross-sectional view of a portion of a light redirecting optical article, showing an alternative sloped channel, according to at least one embodiment of the present invention.
Figure 16:
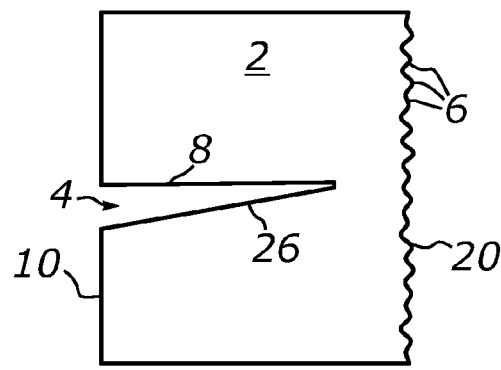
FIG. 16 is a schematic cross-sectional view of a portion of a light redirecting optical article, showing a channel having non-parallel walls, according to at least one embodiment of the present invention.
Figure 17:
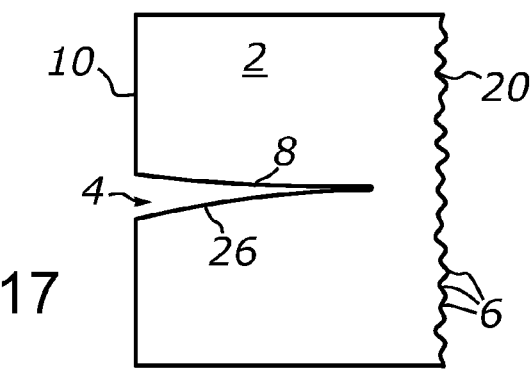
FIG. 17 is a schematic cross-sectional view of a portion of a light redirecting optical article, showing a channel having convex walls, according to at least one embodiment of the present invention.
Figure 18:
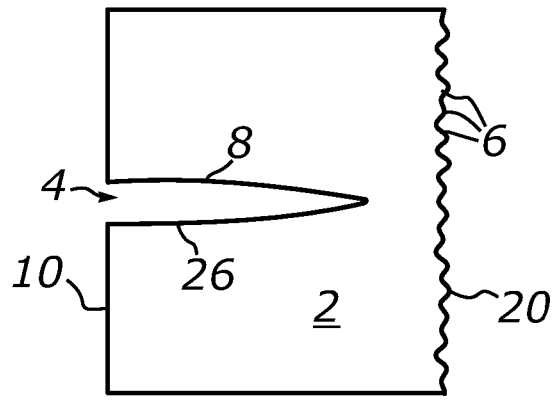
FIG. 18 is a schematic cross-sectional view of a portion of a light redirecting optical article, showing a channel having concave walls, according to at least one embodiment of the present invention.

FIG. 13 through FIG. 21 illustrate various cross-sectional configurations of channels 4 in sheet 2. In FIG. 13, channel 4 has a straight configuration with parallel side walls 8 and 26 which are extending perpendicular to surfaces 10 and 20. FIG. 14 shows channel 4 formed in surface 10 of sheet 2 where walls 8 and 26 of the channel are parallel to each other but both inclined at an angle with respect to a normal to surfaces 10 and 20. FIG. 15 shows channel 4 in which the slope angle of walls 8 and 26 with respect to the same normal mirrors that of FIG. 14. FIG. 16 shows channel 4 in which wall 8 extends parallel to a normal to surface 10 but wall 26 extends at an angle with respect to the same normal. FIG. 17 shows channel 4 in a funnel-shaped configuration with convex walls 8 and 26. FIG. 18 shows channel 4 with concave curvilinear profiles of side walls 8 and 26.

It is noted that this invention is not limited to forming channels 4 in surface 10. At least in some embodiments, channels 4 may be formed in either one or both of surfaces 10 and 20.

Figure 19:
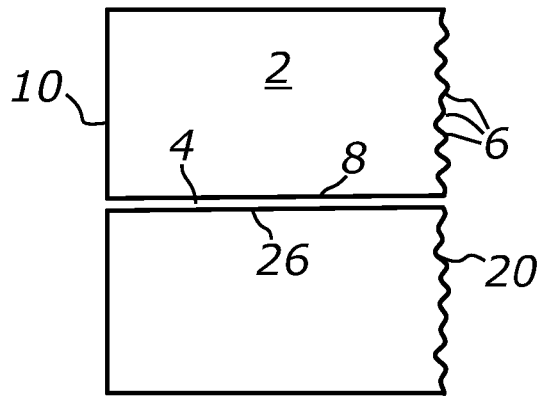
FIG. 19 is a schematic cross-sectional view of a portion of a light redirecting optical article, showing a through-cut channel, according to at least one embodiment of the present invention.
Figure 20:
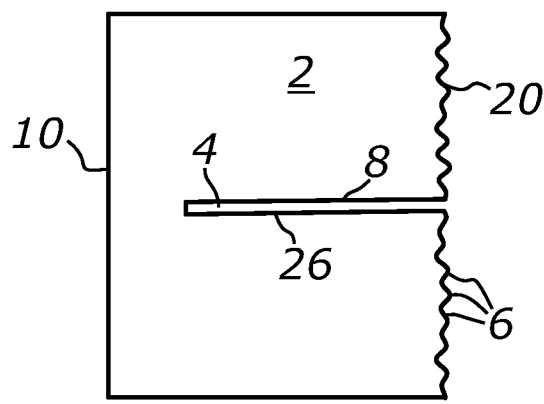
FIG. 20 is a schematic cross-sectional view of a portion of a light redirecting optical article, showing a partial straight channel formed in a textured surface, according to at least one embodiment of the present invention.
Figure 21:
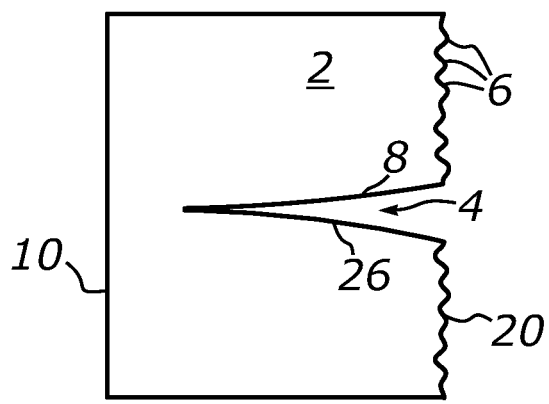
FIG. 21 is a schematic cross-sectional view of a portion of a light redirecting optical article, showing a curvilinear V-shaped channel formed in a light emitting surface, according to at least one embodiment of the present invention.

FIG. 19 illustrates channel 4 extending all the way between surface 10 and 20. Its side walls 8 and 26 are parallel to each other and perpendicular to the prevailing plane of sheet 2. FIG. 20 shows partial straight channel 4 formed in surface 20 of sheet 2 and having parallel walls 8 and 26. In FIG. 21, a curvilinear-profile, funnel-shaped channel is shown formed in surface 20.

It is further noted that channels 4 forming the first parallel array in sheet 2 may have different profiles than channels 4 forming the second parallel array in said sheet. Additionally, the intersecting arrays of channels 4 may be formed in the opposing surfaces of sheet 2. For example, referring to FIG. 2, channels 4 extending parallel to axis 370 may be formed in surface 10 and channels 4 extending along axis 380 may be formed in surface 20. The reference lines defining the orientation of each array may extend perpendicular to each other or make any non-zero angle between one another. When formed in the opposing surfaces, channels 4 that are perpendicular to each other can be made intersecting and extending half-way or more through the thickness of the material of sheet 2. Alternatively, channels 4 that are perpendicular to each other may be staggered and extending less than half-way through the thickness of sheet 2.

According to a preferred embodiment of the present invention, it is generally desired that the surfaces of side walls 8 and 26 of each channel 4 are made as smooth as possible in order to provide a good TIR reflectivity and minimum light scattering. However, in some applications, some residual roughness of the TIR surfaces may be present due to the imperfections of the fabrication process. In certain instances, a slight waviness of the TIR surfaces may be provided for the purpose of controlled dispersion or diffusion of the reflected light beam over a limited angular range.

Figure 22:
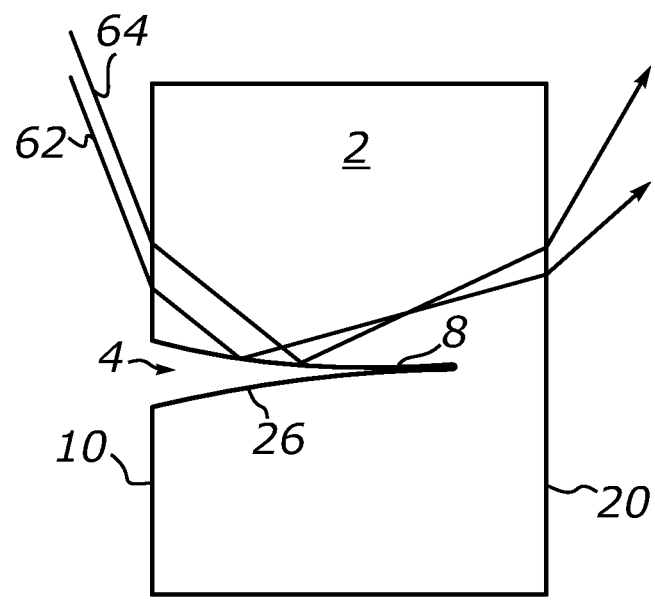
FIG. 22 is a schematic cross-sectional view and raytracing of a portion of a light redirecting optical article, showing a curvilinear V-shaped channel formed in a light receiving surface, according to at least one embodiment of the present invention.

FIG. 22 illustrates the operation of funnel-shaped channel 4. Such channel 4 may be created, for example by laser ablation or by slitting surface 10 with the subsequent stretching of sheet 2 perpendicularly to the longitudinal axis of channel 4. Parallel rays 62 and 64, which may exemplify the direct beam of sunlight incident onto surface 10 from an off-axis direction, are reflected by the TIR surface of wall 8 and exit from the opposite surface of sheet 2. Since the surface of wall 8 is curved, the redirected rays 62 and 64 will no longer be parallel to each other after TIR. Accordingly, a parallel beam of light passing through sheet 2 at the appropriate angles will be dispersed across a broader angular range thus resulting in a more diffuse illumination of the interior compared to the case of a planar wall 8.

Figure 23:
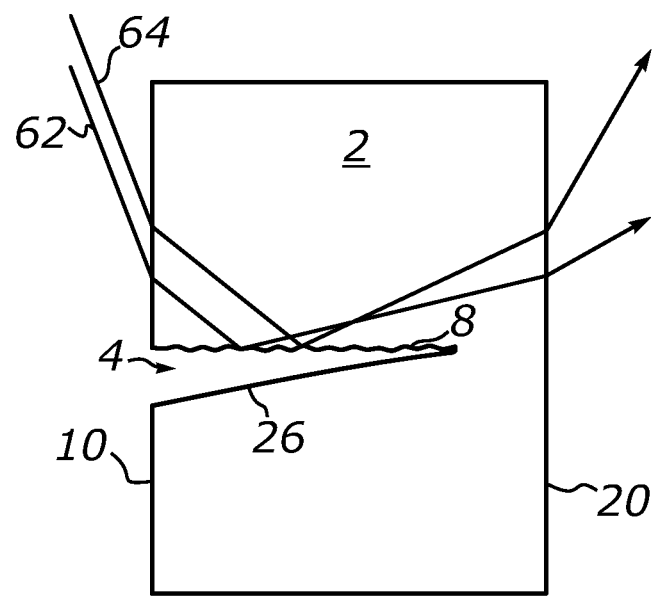
FIG. 23 is a schematic cross-sectional view and raytracing of a portion of a light redirecting optical article, showing a corrugated reflective surface of a channel, according to at least one embodiment of the present invention.

FIG. 23 illustrates an alternative configuration of channel 4 where light diffusing properties are obtained using a different approach. The TIR surface of wall 8 is provided with shallow corrugations which redirect and disperse the incident beam at different angles within a predefined range of angles. Such corrugations may be formed, for example, by laser cutting using multiple passes, by slitting with a blade having a variable thickness, by slitting using a reciprocation blade motion or by any other suitable means. Particularly, it is preferred that the maximum slope of each corrugation is less than a critical angle at which a TIR can occur at the exit surface 20. Accordingly, parallel rays 62 and 64 striking surface 8 at different locations are redirected at different angles and thus emerge from surface 20 at different angles with respect to a surface normal.

It is noted that the spacing between channels 4 and the depth or aspect ratio of individual channels 4 are not limited to be constant across the area of sheet 2. According to one embodiment, at least one of the above parameters may be varied from one channel 4 to another. Additionally, the dihedral angle that channels 4 or one of its side walls form with respect to surface 10 may also be varied within a predefined angular range. According to one embodiment, it may be preferred that such dihedral angle is equal or approximately equal to 90 degrees. In one embodiment, it may be preferred that the dihedral angle varies within ±10° from normal. In other words, the dihedral angle should preferably be greater or equal to 80 degrees.

By way of example and not limitation, the above-described variations of channel 4 parameters may be used to control the bend angle for the redirected light rays or to provide a specific angular distribution of light transmitted by sheet 2. Additionally, the perpendicular arrays of channels 4 may differ from each other in the way the channels are formed or arranged within the arrays.

Figure 24:
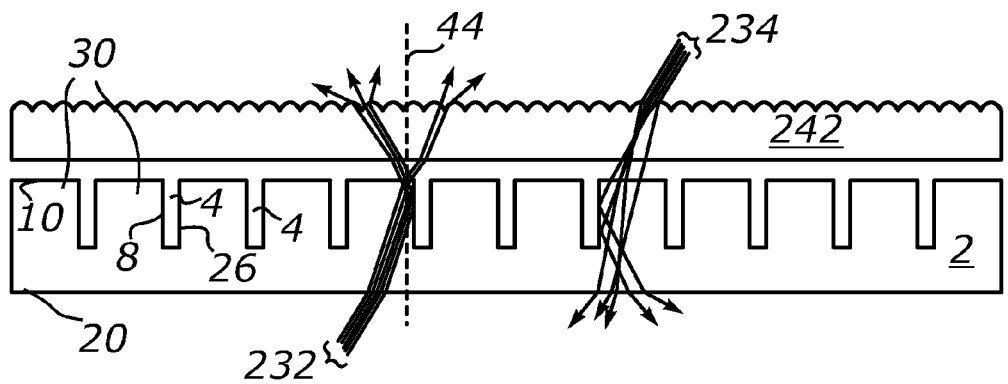
FIG. 24 is a schematic cross-sectional view and raytracing of a light redirecting optical article, further showing a light diffusing layer disposed in optical communication with a surface of an optically transmissive layer, according to at least one embodiment of the present invention.

FIG. 24 shows an exemplary configuration of the optical article of the present invention comprising sheet 2 and further comprising an external light diffusing sheet 242. Diffusing sheet 242 is disposed parallel to sheet 2 and has a light diffusing texture in at least one of its major surfaces. In the non-limiting example illustrated in FIG. 24, the surface texture of sheet 242 is exemplified by a micro-lens array. The lens array may be one-dimensional (lenticular lenses) or two-dimensional.

In operation, an off-axis parallel ray bundle 232 passes through sheet 2 where at least some rays undergo TIR from reflective walls formed by channels 4 and are deflected from the original propagation path into a new propagation direction which mirrors the propagation direction of the other rays with respect to normal 44. As a result of TIR and transmission through sheet 2, the ray bundle 232 becomes split into two beams and is distributed over a certain angular range. Upon exit from sheet 2, rays of ray bundle 232 enter diffusing sheet 242 where the respective beams are further redistributed and diffused into a plurality of divergent directions. Another exemplary off-axis parallel ray bundle 234 first entering diffusing sheet 242 is dispersed before it further enters sheet 2. Sheet 2 further redistributes the rays so that they obtain various propagation directions including those extending into opposing hemispheres or quadrants with respect to normal 44 in the plane of reflection.

Figure 25:
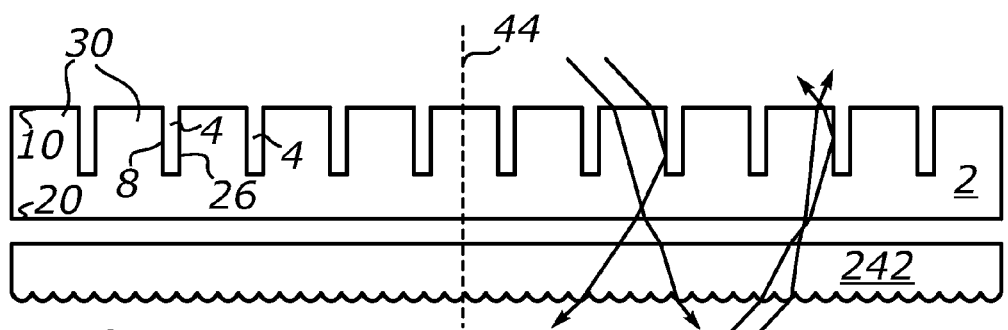
FIG. 25 is a schematic cross-sectional view and raytracing of a light redirecting optical article, further showing a light diffusing layer disposed in optical communication with another surface of an optically transmissive layer, according to at least one embodiment of the present invention.
Figure 26:
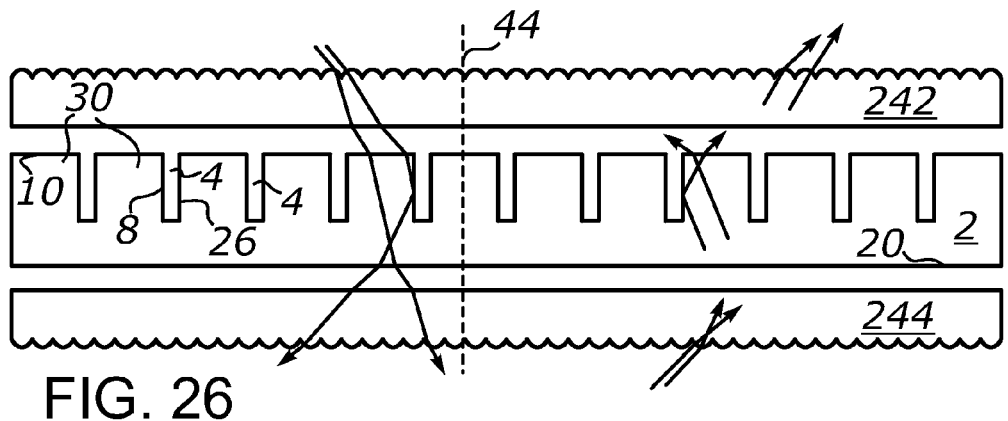
FIG. 26 is a schematic cross-sectional view and raytracing of a light redirecting optical article, further showing two light diffusing layers disposed on both sides of an optically transmissive layer, according to at least one embodiment of the present invention.

FIG. 25 explains operation of the optical article which is similar to that of FIG. 24 except that diffusing sheet 242 is now disposed on the other side of sheet 2. In FIG. 26, an illustrative example of alternative configuration of the optical article is shown where sheet 2 is sandwiched between two opposing diffuser sheets 242 and 244. Such arrangement may be selected, for example, when a further improvement in light diffusion is needed compared to the cases illustrated in FIG. 24 and FIG. 25.

Figure 27:
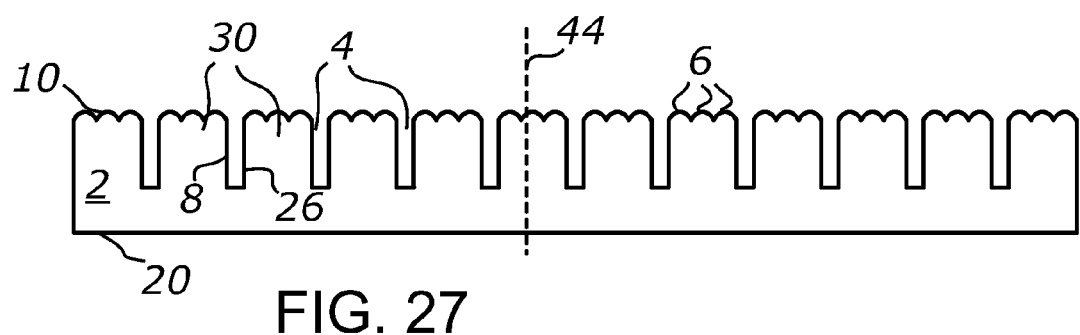
FIG. 27 is a schematic cross-sectional view of a light redirecting optical article, showing light-diffusing surface relief features formed in a major surface of an optically transmissive layer, according to at least one embodiment of the present invention.

FIG. 27 shows a non-limiting example of the optical article according to at least one embodiment, where surface 10 of sheet 2 has a light diffusing textured surface. The light diffusing texture is exemplified by a plurality of lenslets. Each lenslet represents an individual surface relief feature 6 formed in surface 10.

Figure 28:
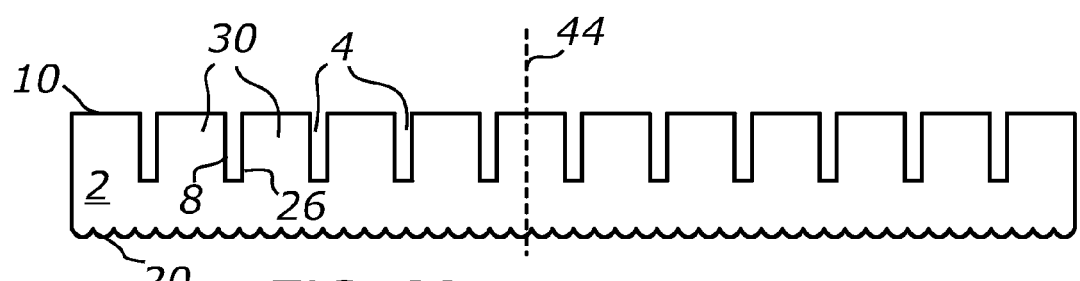
FIG. 28 is a schematic cross-sectional view of a light redirecting optical article, showing light-diffusing surface relief features formed in a different major surface of an optically transmissive layer, according to at least one embodiment of the present invention.
Figure 29:
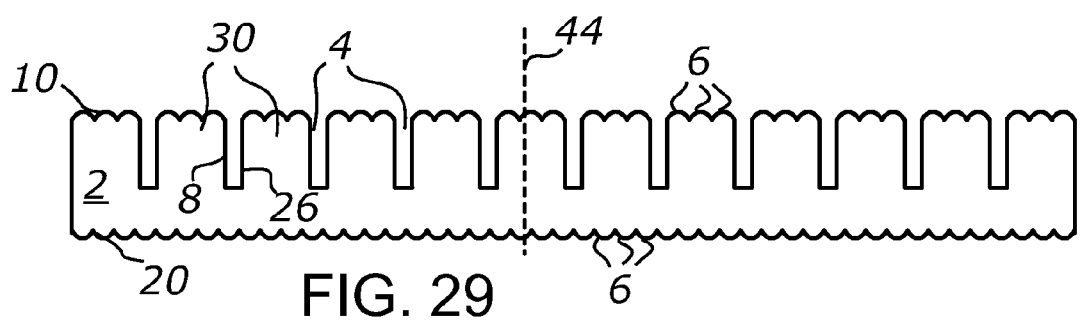
FIG. 29 is a schematic cross-sectional view of a light redirecting optical article, showing a light diffusing surface relief features formed in opposing major surfaces of an optically transmissive layer, according to at least one embodiment of the present invention.

In FIG. 28, a variation of this embodiment is shown where similar lenslets are formed in surface 20 of sheet 2. In FIG. 29, a yet further variation is shown in which surface relief features 6 are formed in both surfaces 10 and 20. It will be appreciated that the combination of TIR walls of channels 4 and lenslets in either one or both of surfaces 10 and 20 will provide an improved wide-angle redistribution and diffusion of at least off-axis rays compared to the diffusers employing refractive-only features.

EXAMPLE 1

Figure 30:
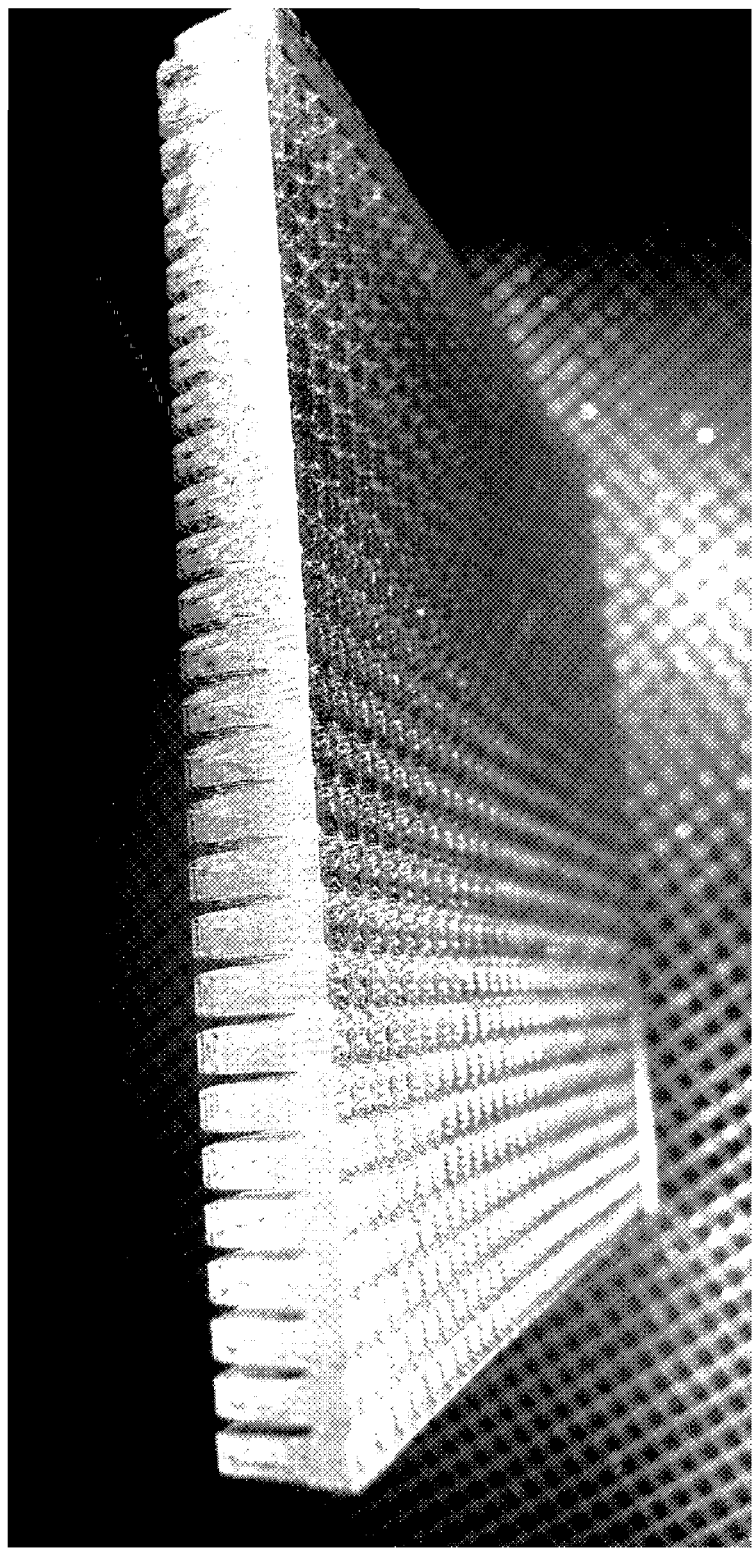
FIG. 30 is a photograph of an exemplary implementation of a light redirecting optical article, showing a layer of optically transmissive material in which a perpendicular grid of channels is cut using a $CO_2$ laser, according to at least one embodiment of the present invention.

FIG. 30 shows a photograph of a prototype sheet 2 made by cutting a grid of narrow channels 4 in a 0.25-inch acrylic (PMMA) sheet by means of material ablation using a 60-W $CO_2$ laser. The laser emits a narrow (about 6 mm) parallel beam with the wavelengths of about 10 micrometers. The laser beam was made scanning across the surface of sheet 2 using a Cartesian gantry system and a system of mirrors and focused on the surface of the acrylic sheet using a 0.75"-diameter ZnSe lens having a focal length of 2". The laser beam scanning speed was selected at about 14 mm/sec.

A first array of parallel channels was cut in one of the smooth surfaces of the acrylic sheet after which a second array of parallel channels was cut in a perpendicular direction in the same surface. The selective material ablation by scanning the focused laser beam across the acrylic sheet surface has resulted in the formation of a rectangular grid of narrow and deep channels in the surface. The laser cutting process has created slightly tapered channels with heat-polished, curvilinear side walls extending transversally about ¾ into the sheet thickness. The intersecting perpendicular pairs of adjacent channels defined a two-dimensional array of light-channeling cells each having four TIR walls formed by the polished side walls of the channels.

A beam of parallel light was produced by a collimated LED light source. The finished laser-patterned sheet was illuminated by the collimated light source at incidence angles ranging from 0° to approximately 75°. The optical axis of the light source was tilted with respect to the plane of the acrylic sheet to create an off-axis angle of incidence. The off-axis direction of the incident beam was selected so that the projection of said direction onto the sheet was parallel to the longitudinal axis of one of the two intersecting arrays of the laser-cut channels and perpendicular to the longitudinal axis of the other array.

In operation, the propagation of off-axis collimated light through the prototyped sheet 2 has resulted in splitting the beam into two well-defined beams propagating generally towards the opposing ends of the acrylic sheet in the respective plane of reflection. The output beams were observed on a light scattering target disposed parallel to the acrylic sheet. The target has revealed two distinct spots on the opposite sides from a normal to the plane of the sheet: one corresponding to the beam portion that passed through the sheet without interacting with TIR walls and the other one corresponding to the beam portion reflected from TIR walls. The angular distance between the two spots was found to be approximately twice the incidence angle of the original off-axis parallel beam incident onto the acrylic sheet.

Likewise, when the off-axis tilt of the incident collimated beam was azimuthally turned by 90 degrees with respect to the surface of the prototype sheet 2, thus causing the light beam interaction primarily with the other (perpendicular) array of the laser-cut channels, the incident beam was split into two distinct beams in a perpendicular plane. Furthermore, exposing the laser-cut acrylic sheet to a collimated beam incident from a direction which projection onto the sheet surface was not parallel to either longitudinal axis has produced four distinct beams demonstrating beam splitting in both perpendicular planes of reflection.

EXAMPLE 2

Laser-cut channels were produced according to the method described above in a ¼" acrylic sheet having a light-scattering, matte-finish surface. The illumination of such light-scattering variation of sheet 2 with an off-axis beam with approximately 45° incidence angle has produced a broad, relatively evenly distributed, scattered beam of light spanning approximately ±60° from a normal to sheet 2 in the prevailing plane of beam propagation. The total angular span of the scattered beam was around 120°. For comparison, the off-axis parallel beam illumination of a similar light-diffusing acrylic sheet having no channels 4 and no TIR walls has resulted in much narrower scattered beam (less than 60°) and light propagation only towards the opposing direction from the light source, exhibiting notably unequal light distribution on the target. Accordingly, the formation of laser-cut TIR channels in the surface of acrylic sheet has produced a light beam which angular spread is approximately two times greater than that of the reference sheet. Additionally, the uniformity of the transmitted light beam has been improved compared to the reference case due to creating a nearly symmetric light distribution with respect to a normal to the sheet surface. Thus, when used in skylights or fenestration systems, such light-redirecting and light-spreading acrylic sheet may improve daylight penetration into under-illuminated parts of the building interior and also reduce glare associated with the direct beam of sunlight.

Figure 31:
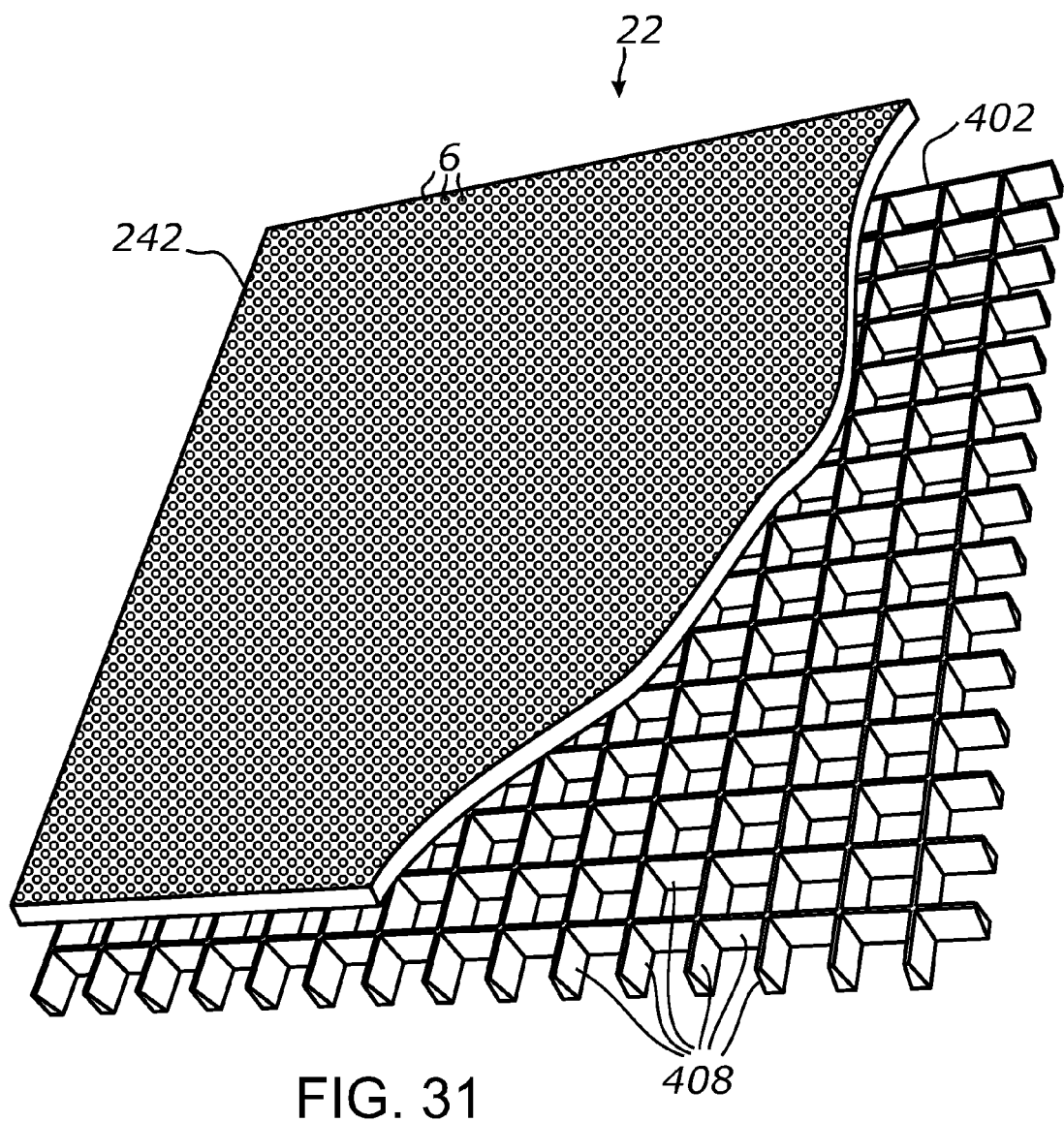
FIG. 31 is a schematic perspective view of a light redirecting optical article, showing a specularly reflective grid panel coupled to an optically transmissive, light diffusing element, according to at least one embodiment of the present invention.

A second embodiment of the optical article of the present invention is directed to a panel formed by a rectangular grid of specular reflectors and used in conjunction with a broad-area light diffusing element. Such an embodiment is illustrated in FIG. 31 showing a panel 22 which includes a specularly reflective grid 402 and light diffusing sheet 242 disposed over the panel area of grid 402. Grid 402 has a form of a planar panel and includes an open-cell grid formed by intersecting mirrored walls 408. Each mirrored wall 408 longitudinally extends parallel to the prevailing plane of the panel and transversally extends perpendicularly or nearly perpendicularly to such plane. Similarly to the embodiment illustrated in FIG. 24, light diffusing sheet 242 of FIG. 30 may have lenslet-shaped surface relief features 6 or any other type of light diffusing elements or surface texture.

In a non-limiting example, reflective grid 402 may be exemplified by the egg crate silver louver light panel manufactured by Plaskolite, Inc. The louver panel may be customarily made from acrylic of polystyrene with the subsequent metallization for specular reflectivity.

In another non-limiting example, grid 402 may be exemplified by the silver egg crate plastic lighting panel marketed by Ridout Plastics/Eplastics. The panel is commercially available in standard size of 2'×4'×0.5" and has a specularly reflective metalized finish.

Figure 32:
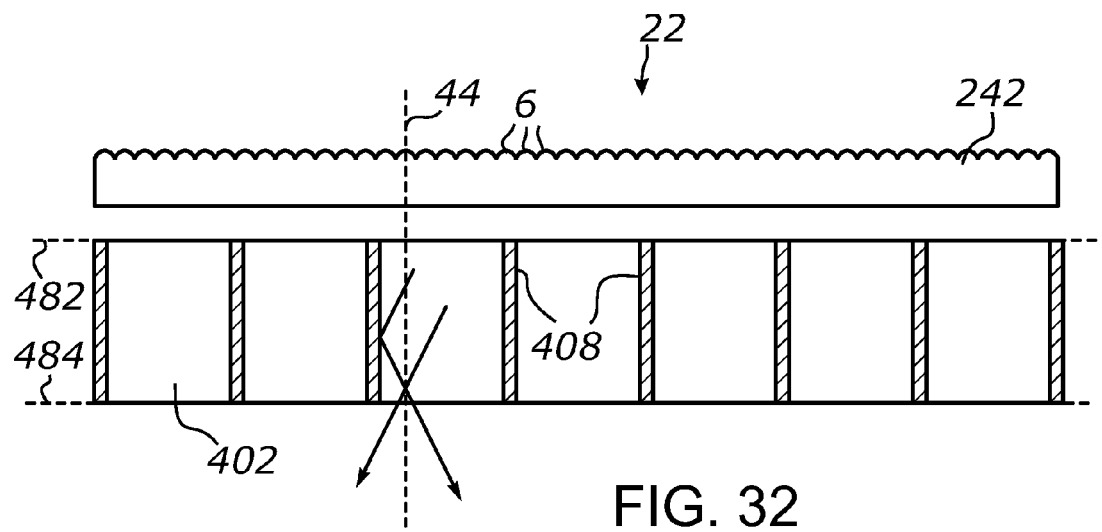
FIG. 32 is a schematic cross-sectional view of a portion of a light redirecting optical article, showing an array of planar mirrored reflectors disposed perpendicularly to a prevailing plane of a reflective grid panel, according to at least one embodiment of the present invention.

FIG. 32 illustrates an exemplary cross-section and operation of a portion of panel 22 shown in FIG. 31. Referring to FIG. 32, horizontally disposed grid 402 includes a plurality of vertical reflective walls 408 which are made from an opaque rigid material and are also mirrored. Parallel horizontal planes 482 and 484 define the upper and lower boundaries of the panel 22. Sheet 242 disposed above grid 402 is designed to diffuse light incident from the above and transmit it further to the reflective grid. Grid 402 further disperses at least the off-axis rays by reflecting at least a portion of such rays from walls 408. The parameters of walls 408 and their spacing may be configured to provide for at least partial interception of the incident off-axis light and redistributing light into the opposing hemispheres relatively to normal 44 to the panel. Likewise, walls 408 may be designed to provide any desired ratio between the amount of light that passes through grid 402 without striking any vertical wall and the amount of light that is redirected by one or more walls towards the same or opposing edges of the panel in the plane of reflection.

Figure 33:
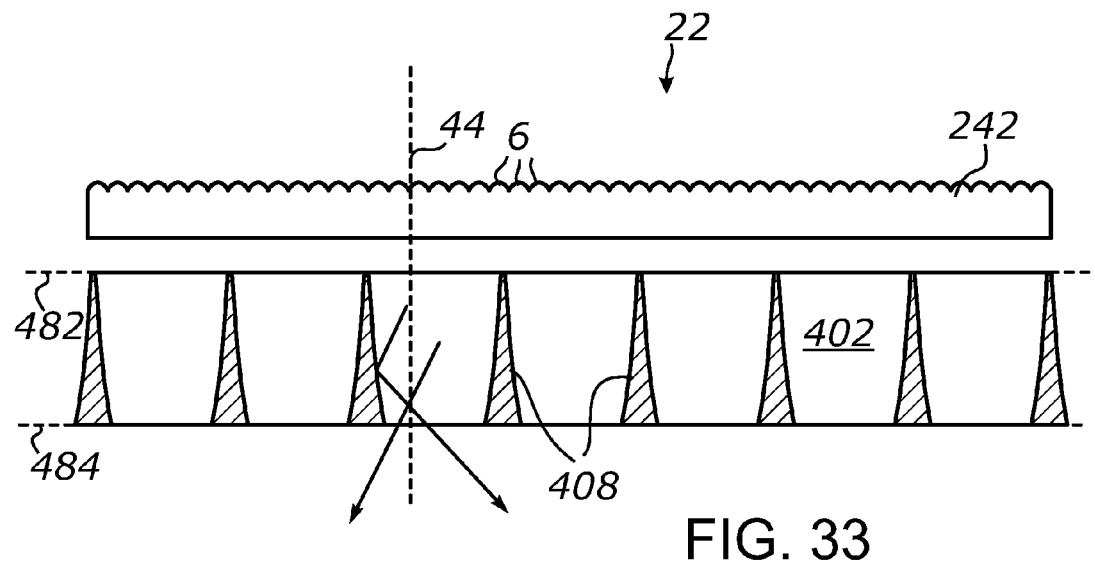
FIG. 33 is a schematic cross-sectional view of a portion of a light redirecting optical article, showing an alternative shape of reflectors, according to at least one embodiment of the present invention.

FIG. 33 shows a different cross-sectional shape of reflective walls 408 where each wall 408 is tapered towards the top and has reflective surfaces with curvilinear profiles. An advantage of using curvilinear profiles for walls 408 can be that such configuration may provide a greater stiffness to grid 402 may. Additionally, a non-planar shape of walls 408 may further promote light flux dispersion and homogenization.

Figure 34:
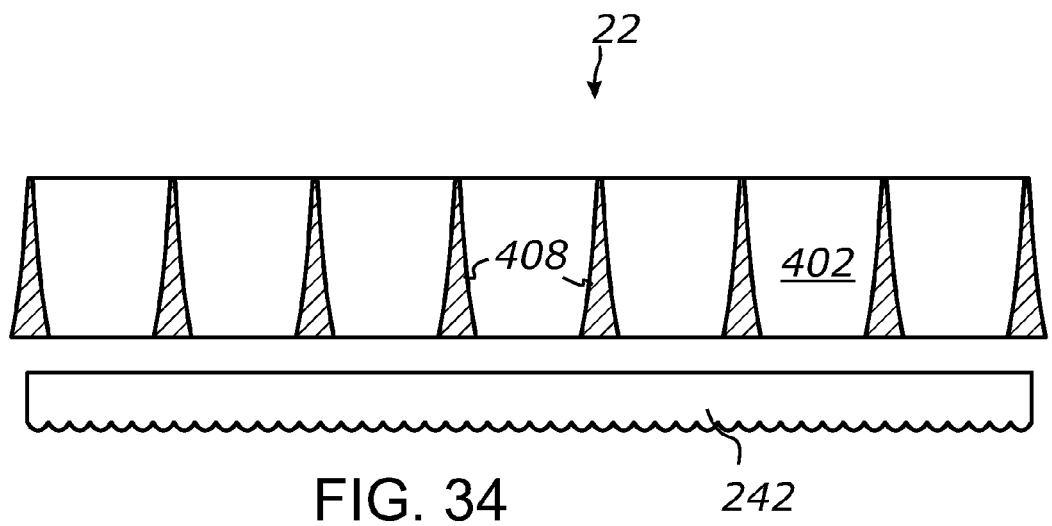
FIG. 34 is a schematic cross-sectional view of a portion of a light redirecting optical article, showing an alternative disposition of an optically transmissive light diffuser with respect to a reflective grid panel, according to at least one embodiment of the present invention.

FIG. 34 shows an alternative mutual disposition of grid 402 and light diffusing sheet 242 in comparison to FIG. 33. As it is shown, sheet 242 may also be disposed below the grid 402 and configured to further diffuse and redistribute light emerging from the grid panel.

Figure 35:
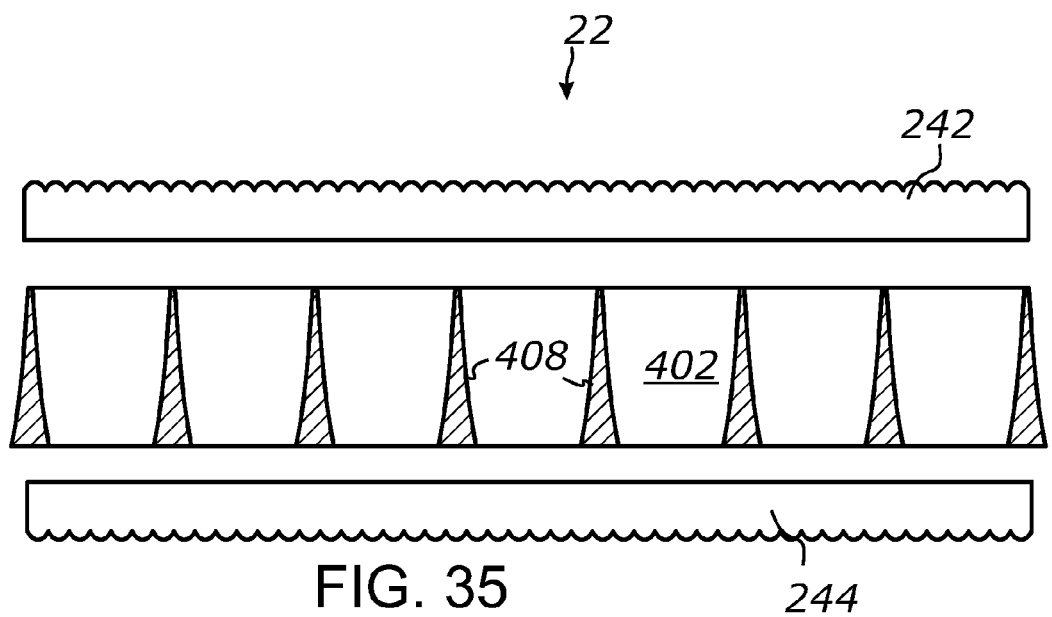
FIG. 35 is a schematic cross-sectional view of a portion of a light redirecting optical article, showing a reflective grid panel sandwiched between two light diffusers, according to at least one embodiment of the present invention.

In FIG. 35, grid 402 is shown sandwiched between opposing parallel diffusing sheets 242 and 244. In such configuration, the degree of light diffusion may be increased compared the case of a single light diffusing sheet although the total light transmission of panel 22 may be somewhat reduced compared to the same case.

Figure 36:
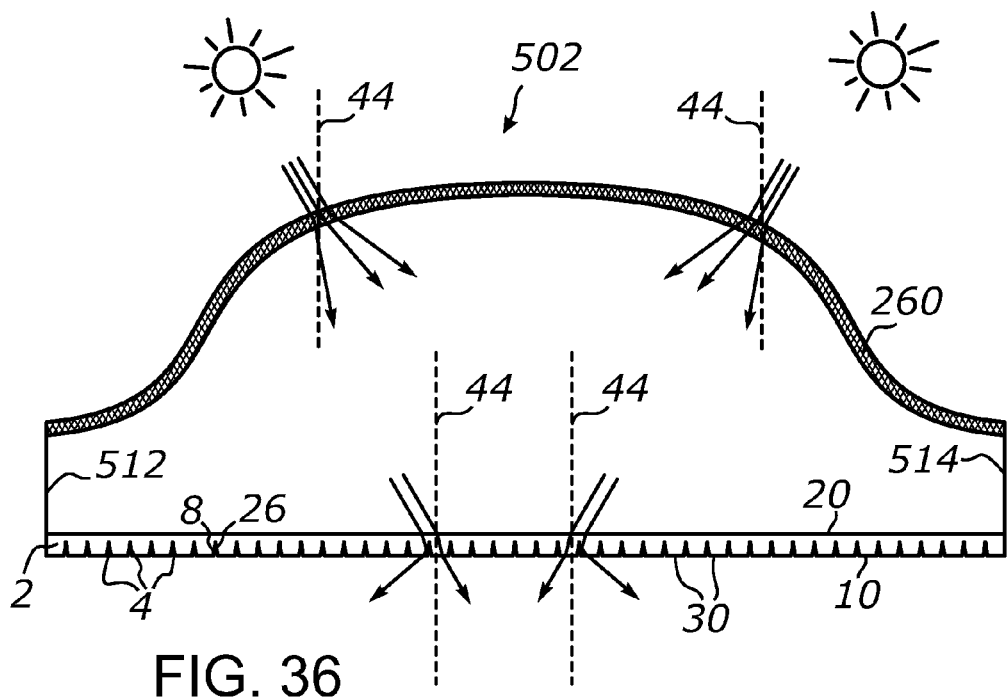
FIG. 36 is a schematic cross-sectional view of an exemplary skylight implementation of a light redirecting optical article including a layer of transparent material disposed below a dome-shaped diffuser and having channels formed between its major surfaces, according to at least one embodiment of the present invention.

FIG. 36 shows an exemplary implementation of the optical article within a skylight 502. The skylight can be ordinarily designed for rooftop installation and illumination of the building interior with the natural sunlight.

Referring to FIG. 36, skylight 502 includes a dome-shaped diffuser sheet 260, optically transmissive sheet 2 and optional reflective side walls 512 and 514. Diffuser sheet 260 can be made from an optically clear plastic material, such as PMMA, polycarbonate and the like, and may have at least one microstructured surface to improve light diffusion. Sheet 2 is also made from an optically transparent material, preferably PMMA, defined by opposing parallel surfaces 10 and 20. Sheet 2 has at least one array of laser-cut deep and narrow channels 4 extending vertically (along normal 44) between surface 10 towards surface 20 and parallel to each other. Each channel 4 has opposing TIR walls 8 and 26. Similarly to some of the embodiments illustrated in reference to FIG. 1 through FIG. 4, channels 4 may also be arranged into two such arrays crossed at the right angle with respect to each other thus forming a plurality of square or rectangular cells 30 each defined by four vertical TIR walls. Walls 512 and 514 of skylight 502 are preferably covered with a sheet or film of specularly reflective material to aid in channeling light from sheet 260 to sheet 2.

In operation, direct sunlight striking the diffuser sheet 260 is dispersed across a limited angular range which will normally include various off-axis rays that enter sheet 2. At least a portion of such off-axis rays may pass through sheet 2 without interacting with any of the walls 8 and 26 and thus emerge from surface 10 without a change in the propagation direction. At least a portion of rays may also reflect from one or more walls 8 and/or 26 and thus may change the propagation direction resulting in a broad angular spread into the opposing quadrants relatively to normal 44 in the plane of reflection. Importantly, TIR walls 8 and/or 26 allow for a greater bend angle compared to the transmissive diffusers employing surface microstructures and may thus be configured to illuminate portions of the building interior which would not otherwise be adequately illuminated.

Figure 37:
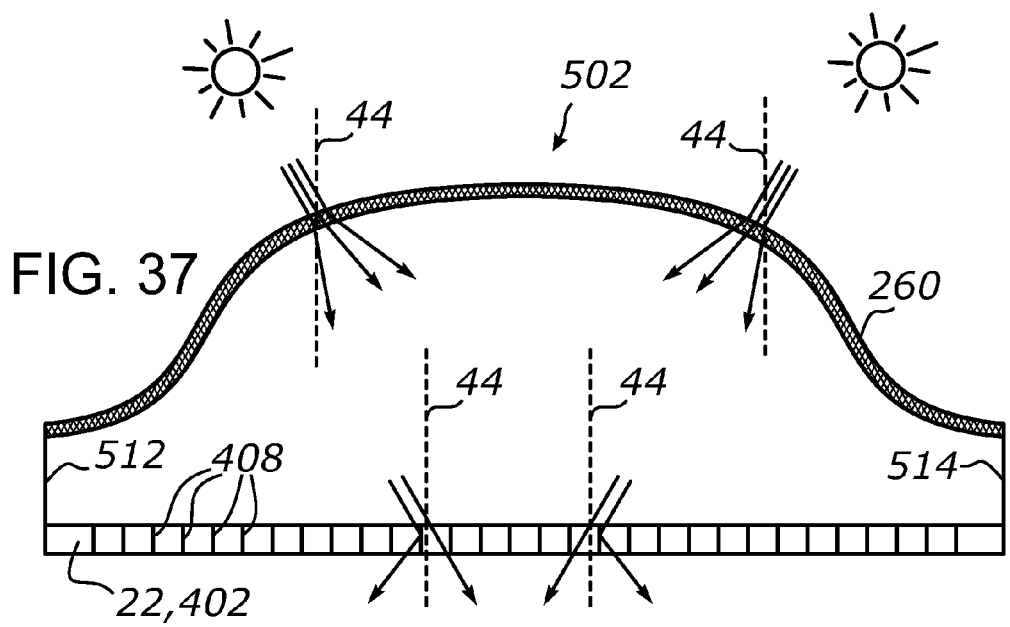
FIG. 37 is a schematic cross-sectional view of another exemplary skylight implementation of a light redirecting optical article including a specularly reflective grid panel disposed below a dome-shaped diffuser, according to at least one embodiment of the present invention.

In FIG. 37, skylight 502 is shown to incorporate grid 402 which reflective walls 408 redirect at least a portion of sunlight passing from the above through the grid. Accordingly, since the specular reflections within grid 402 result in effective bending of at least off-axis rays, the daylight distribution within the building can be improved. This can be illustrated by the following reasoning. It will be appreciated that, in the absence of sheet 2 of FIG. 36 or reflective grid 402 of FIG. 37, the sunlight entering skylight 502 from an off-axis direction and shining through a conventional transmissive diffuser will tend to illuminate the room corner which is opposite to the sun's direction. Since sheet 2 of FIG. 36 or reflective grid 402 FIG. 37 can be configured to redistribute light between opposing directions, the addition of the respective light redirecting components to the skylight may allow for illuminating the opposing corners of the room without sacrificing the light transmission efficiency. Thus, as a minimum, skylight 502 can be configured to reduce the inherent over-illumination of some parts of the building interior and under-illumination of the other parts of the building, the problem commonly associated with conventional skylights. Moreover, the respective parts of skylight 502 may be configured to provide about equal illumination of the opposing parts of the building interior at least for a predefined range of sun's elevations.

It is noted, in reference to FIG. 36 and FIG. 37, that the type of skylights in which the optical article can be incorporated is not limited to the dome-shaped configurations, but can similarly be applied to the case where the skylight can have any other suitable shape, including but not limited to a planar shape, pyramidal shape, prismatic shape, and the like. It is further noted that the front sheet of the skylight is not limited in type to those having light-diffusing microstructures. The present invention may also be applied to the case of smooth-surface skylights which can be optically clear, translucent or pigmented and may have light transmissivity and/or light diffusion varying in a broad range.

Further details of operation of the optical article exemplified by sheet 2 or a combination of reflective grid 402 and one or more transmissive light diffusers, as shown in the drawing figures, as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An optical article for directing and distributing light, comprising:
   a generally planar layer of an optically transmissive material defined by a first major surface configured for light input and an opposing major surface configured for light output;
   a plurality of channels formed in said layer;
   said plurality of channels defining a plurality of TIR surfaces extending perpendicular or near-perpendicular to a prevailing plane of said layer; and
   a light diffusing element disposed in optical communication with said layer;
   wherein said plurality of TIR surfaces is arranged into two or more parallel arrays crossed at an angle with respect to each other.

2. An optical article as recited in claim 1, wherein each of said first and second major surfaces includes surface portions that are parallel to a prevailing plane of said layer.

3. An optical article as recited in claim 1, wherein at least one of said plurality of channels defines a pair of opposing walls that are generally parallel to each other.

4. An optical article as recited in claim 1, wherein said layer is adapted to redirect at least a portion of off-axis rays by a sufficiently high bend angle so as to split an incident parallel beam of light into two or more distinct light beams propagating towards different directions.

5. An optical article as recited in claim 4, wherein said directions point to opposing quadrants or hemispheres with respect to a normal to said layer in a plane of incidence.

6. An optical article as recited in claim 1, wherein said layer is positioned to receive daylight entering a building interior through an opening or a structure selected from the group consisting of glazed wall openings, wall windows, roof windows, doors, and skylights.

7. An optical article as recited in claim 1, wherein at least one of said TIR surfaces has a curved surface profile.

8. An optical article as recited in claim 1, wherein said light diffusing element comprises random surface relief features formed in a surface of said optically transmissive material.

9. An optical article as recited in claim 1, wherein said light diffusing element comprises surface relief features formed in at least one of said TIR surfaces.

10. An optical article as recited in claim 1, wherein said light diffusing element comprises light diffusing microstructures formed in said first major surface.

11. An optical article as recited in claim 1, wherein said light diffusing element comprises light diffusing microstructures formed in said second major surface.

12. An optical article as recited in claim 1, wherein said light diffusing element comprises light diffusing microstructures formed in both first and second major surfaces.

13. An optical article as recited in claim 1, wherein said light diffusing element comprises matte surface texture.

14. An optical article as recited in claim 1, wherein said light diffusing element comprises an optically transmissive light diffusing sheet attached to said first major surface.

15. An optical article as recited in claim 1, wherein said light diffusing element comprises an optically transmissive light diffusing sheet attached to said second major surface.

16. An optical article as recited in claim 1, wherein plurality of TIR surfaces is arranged into a parallel array.

17. An optical article as recited in claim 1, wherein spacing between adjacent channels is considerably greater than a width of the channels.

18. An optical article as recited in claim 1, wherein said light diffusing element comprises an optical element selected from the group consisting of light filtering elements, UV-blocking elements, IR-rejecting elements, polarizing elements, and fluorescent elements.

19. An optical article as recited in claim 1, wherein said light diffusing element compromises an optically transmissive light diffusing sheet spaced apart from said generally planar layer.

* * * * *